(12) United States Patent
Nakamura et al.

(10) Patent No.: US 7,922,214 B2
(45) Date of Patent: Apr. 12, 2011

(54) CONNECTOR STRUCTURE WITH LOCK MECHANISM

(76) Inventors: Yasuaki Nakamura, Shizuoka (JP); Hideto Usui, Shizuoka (JP)

(*) Notice: Subject to any disclaimer, the term of this patent is extended or adjusted under 35 U.S.C. 154(b) by 437 days.

(21) Appl. No.: 11/575,282

(22) PCT Filed: Sep. 12, 2005

(86) PCT No.: PCT/JP2005/017210
§ 371 (c)(1),
(2), (4) Date: Oct. 31, 2008

(87) PCT Pub. No.: WO2006/030926
PCT Pub. Date: Mar. 23, 2006

(65) Prior Publication Data
US 2009/0214287 A1  Aug. 27, 2009

(30) Foreign Application Priority Data

Sep. 14, 2004 (JP) ................................ 2004-266464
Sep. 28, 2004 (JP) ................................ 2004-281318

(51) Int. Cl.
*F16L 37/18* (2006.01)
(52) U.S. Cl. .................... 285/316; 285/307; 285/377
(58) Field of Classification Search ............ 285/307, 285/316, 317, 377, 376, 401
See application file for complete search history.

(56) References Cited

U.S. PATENT DOCUMENTS

| | | | | |
|---|---|---|---|---|
| 771,388 A * | 10/1904 | Nusbaum | ...... | 285/337 |
| 788,600 A * | 5/1905 | Rogers | ...... | 285/377 |
| 2,599,222 A * | 6/1952 | Bergqvist et al. | ...... | 403/371 |
| 2,799,344 A * | 7/1957 | Muse | ...... | 285/396 |
| 3,097,001 A * | 7/1963 | Lebus, Sr. | ...... | 285/317 |
| 3,211,479 A * | 10/1965 | Brown | ...... | 285/360 |
| 3,219,373 A * | 11/1965 | Sutliff | ...... | 285/307 |
| 3,301,567 A * | 1/1967 | Barr | ...... | 285/360 |
| 4,313,626 A * | 2/1982 | Duncan | ...... | 285/316 |
| 4,491,060 A * | 1/1985 | Boski | ...... | 92/128 |
| 4,878,695 A * | 11/1989 | Whitham | ...... | 285/401 |
| 5,087,086 A * | 2/1992 | Snedeker | ...... | 285/377 |
| 6,877,778 B2 * | 4/2005 | Froment et al. | ...... | 285/402 |
| 7,044,507 B2 * | 5/2006 | Ricard | ...... | 285/330 |
| 7,731,243 B2 * | 6/2010 | Tiberghien et al. | ...... | 285/316 |

* cited by examiner

*Primary Examiner* — David E Bochna
(74) *Attorney, Agent, or Firm* — Trojan Law Offices

(57) ABSTRACT

A connector structure securely connectable in a locked state and releasable by an easy operation, comprising a supplying connection part for supplying a fluid and receiving connection part for receiving the supply of fluid. The connector structure also comprises a securing mechanism having an operating member moving according to a connecting operation between the supplying connection part to the receiving connection part, holding the connected state of the supplying part to the receiving part in a securely locked state and releasing the locked state of the supplying part to the receiving part by movement of the operating member according to the next pressing-in operation of the supplying part and an energizing mechanism energizing the supplying part in the separating direction thereof from the receiving part. When in the locked state, the pressurized fluid can be supplied from the supplying connection part to the receiving connection part.

4 Claims, 19 Drawing Sheets

CONNECTOR STRUCTURE WITH LOCK MECHANISM

CROSS-REFERENCES TO RELATED APPLICATIONS

The present application is a U.S. National Stage Application under 35 U.S.C. 371 of PCT/JP2005/017210, filed on Sep. 12, 2005, which claims priority to Japanese Patent Application 2004-266464, filed on Sep. 14, 2004 and Japanese Patent Application 2004-281318, filed on Sep. 28, 2004.

BACKGROUND OF THE INVENTION

1. Field of the Invention

This invention relates to connector structures with lock mechanisms comprised of a supply connection component for supplying a fluid and a reception connection component for receiving supply of the fluid.

2. Description of the Related Art

Former supply devices supplying fluids and reception devices utilizing those fluids were assembled of fuel injection type lighters and fuel injection gas tanks, for example, with such connector structures disposing respectively a lighter side injection port and a gas tank side discharge port and basically operating by executing an opening operation through pressing of both valves and allowing the fluid within the gas tank to be injected into the lighter. (Reference Examined Utility Model Application Publication S39-14343 and Examined Utility Model Application Publication H03-35972.)

Former connector structures had a simple structure by which the connection condition between the gas lighter acting as a reception device that utilizes the fluid and the gas tank acting as a supply device for replenishment injection of the fluid to the gas lighter storing the fluid was intended only for the time at which replenishment injection of fluid to the gas lighter was executed and were not a structure for ordinary connection.

On the other hand, there is demand based on utility for the establishing of a supply device that stores fluid for the reception device in such a way that it is ordinarily connected and supplies the stored fluid, and in such an instance, a structure that can be easily configured as a connection component mechanism by providing a pump on the reception device side so as to supply fluid from within the supply device, but placement of a fuel pump and pump control mechanism on the reception device side would be required, and this makes the reception device side more complex and in turn becomes an obstacle to designing for compact dimensions.

Based on the above points, it is preferable to render a pump on the reception device side unnecessary by supplying fluid through use of a supply device storing fluid in a pressurized condition, such as with the previously described gas tank, but if such a supply device is not in a currently installed condition it may cause problems such as fluid leakage or poor fluid supply.

In addition, there is sought a structure that locks to prevent easy disconnection by such as vibration of the connected supply device, but when structured to install by inserting the supply device into the reception device a problem arises in the difficulty of removing the supply device after use.

Furthermore, to prevent leakage of fluid, it is necessary to form the structure to easily and reliably complete connector separation at removal of the supply device from the reception device during use.

This invention considers the above described issues and has as its purpose the provision of a connector structure with lock mechanism comprising a supply connector for supplying fluid and a reception connector for receiving fluid in a way that enables reliable connecting of the supply device storing fluid in a locked condition by use of a simple operation and enables reliable release and removal by use of a simple operation.

BRIEF SUMMARY OF THE INVENTION

Disclosure of the Invention

The connector structure with lock mechanism of this invention is a connector structure comprising a supply connector for supplying fluid and a reception connector for receiving the supply of fluid, and it is characterized by possessing an operating member that shifts in conjunction with the connection movement of said supply connector and said reception connector, by providing a fastening mechanism for maintaining a lock condition in which has been fastened the connection condition of said supply connector and said reception connector in conjunction with shifting of said operating member and for releasing the lock condition of said supply connector and said reception connector with further shifting of said operating member in conjunction with the next pressing inward operation of said operating member, and by providing a force applicator for applying force in the separation direction to said supply connector, and being capable of supplying fluid from said supply connector to said reception connector.

It is preferred that the above described fastening mechanism provide a mating component disposed on said supply connector and an operating member disposed on said reception connector and which is capable of shifting in conjunction with the pressing inward operation of said supply connector and mating with said mating component.

It is preferred that the above described operating member be structured with a second ring capable of rotation shift between a first ring and a third ring, that the first ring and third ring maintain rotation capability and axial direction shift capability at the interior of a ratchet holder, that the second ring provide guide protrusions for mating with ratchet steps disposed on said ratchet holder, and locking protrusions for mating with a mating protrusions to act as a mating components disposed on said supply connector, and slide hooks for receiving rotation force by contact with the third ring, so that the second ring shifts in the axial direction through influence of the first ring in conjunction with the connection operation of said supply connector, that while in such transit it receives rotation force by contact with the third ring, that it rotation shifts by one increment in conjunction with the change in mating position for the single instance axial direction shift, that said locking protrusions enters a lock condition by mating with said mating protrusions, and that at the next axial direction shift the second ring rotation shifts by the next one increment and mating between said locking protrusions and said mating protrusions is released.

It is also acceptable to structure such that said second ring receives additional rotation direction force by contact with said first ring.

It is preferred that said release spring application force operate on said supply connector in the separation direction and also operate on said operating member to prevent floating movement of said operating member.

It is also acceptable to structure such that a fastening sound is emitted from within said operating member at time of rotation movement by ordinary operation of application force.

In addition, it is preferred that there be further provided a seal member to form a seal between said supply connector and said reception connector, and that at time of connection movement, supply of fluid is enabled after forming a seal by use of said seal member, and at time said fastening mechanism undergoes a lock operation and release, said seal member is separated after lock release and passage blockage.

According to the above described invention, because there are provided a fastening mechanism for maintaining the supply connector and reception connector in a locked condition by the shifting of the operating member in conjunction with the connection movement and for releasing the locked condition in conjunction with the next pressing inward action and a force applicator for applying force in the separation direction, the locked condition and released condition are activated by movement of the fastening mechanism corresponding to the connection movement of the supply connector, there are prevented occurrences of dislocation of the supply connector by such as vibration and incomplete connection conditions, and furthermore, the disconnection movement can also be performed easily by pressing the supply connector inward another time while in the connection condition.

In addition, it is possible to reliably obtain the connection condition and release condition without inadvertent placement in a position of partial connection, and there is no engendering of pressurized fluid leakage or poor fluid supply. Moreover, by performing the connection movement and release movement with a movement that pressing the supply connector inward, it is not necessary to dispose a operating component in the vicinity of the reception connector in order to execute connection and release, which allows a simpler structure.

Furthermore, according to the substantive structure of the fastening mechanism, it is possible to obtain reliable lock and release movements with the three ring structure, without rotation force being applied to the main components of the reception connector.

With the application of ordinary pressing pressure, it is always possible to cause exercise of application force on the lock ring and to generate a click sensation and fastening sound from the ratchet, providing confirmation of the connection operation.

DETAILED DESCRIPTION OF THE INVENTION

Preferred Embodiments for Implementing the Invention

Figure 1:
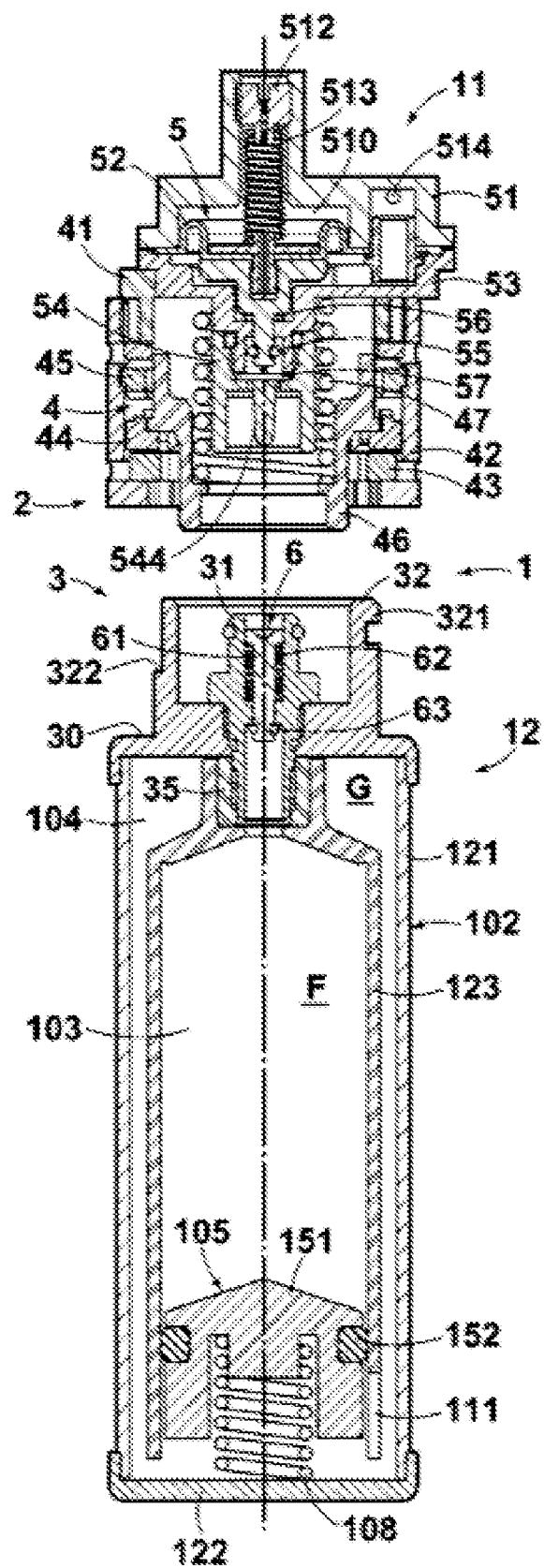
FIG. 1 is a full unit cross section drawing showing the separated condition of the connector structure with the supply connector of the supply device and the reception connector provided with the pressure regulator mechanism according to the first embodiment of this invention.
Figure 2:
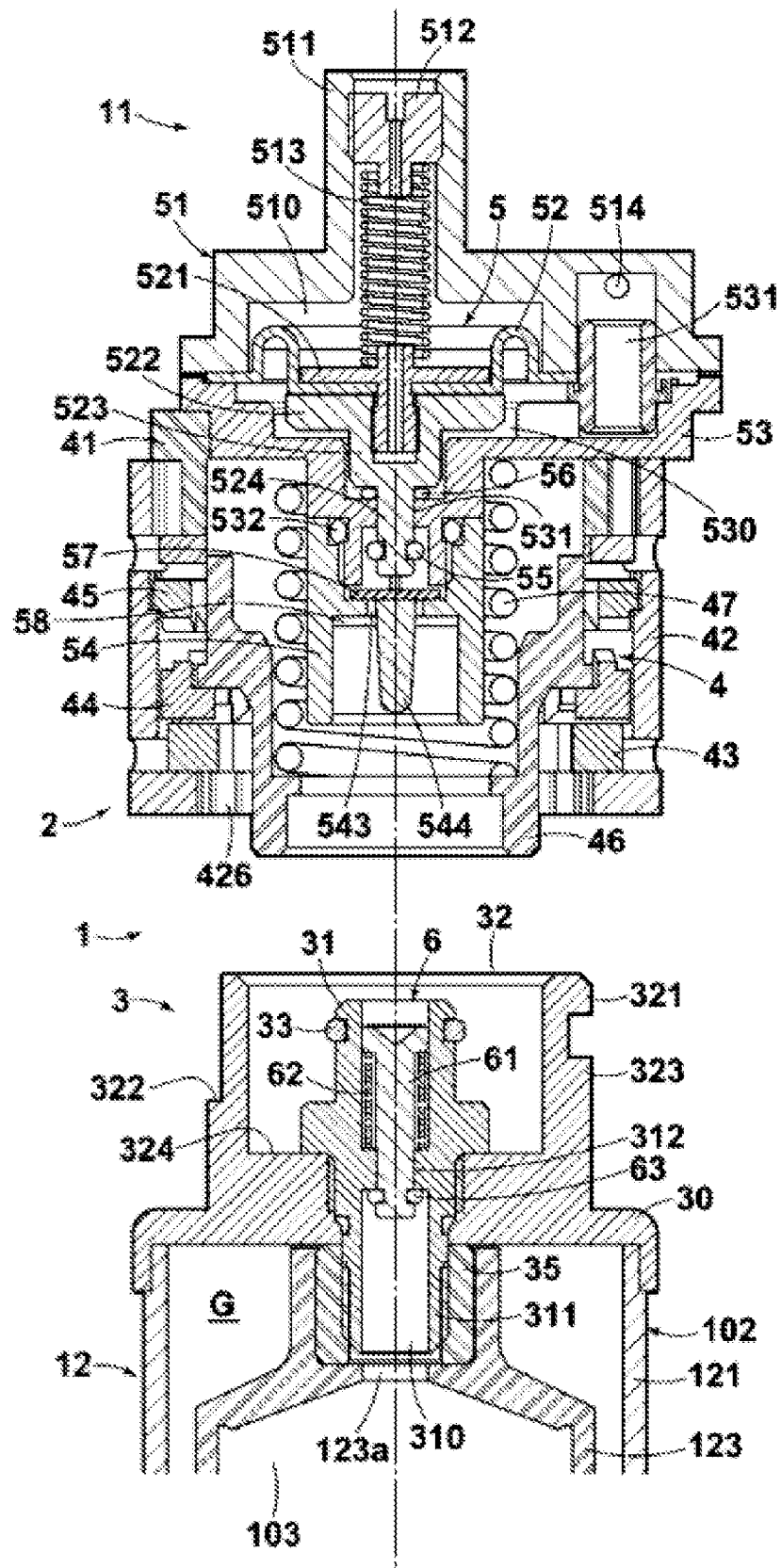
FIG. 2 is a main component expanded cross section drawing of the connector structure of FIG. 1.
Figure 3:
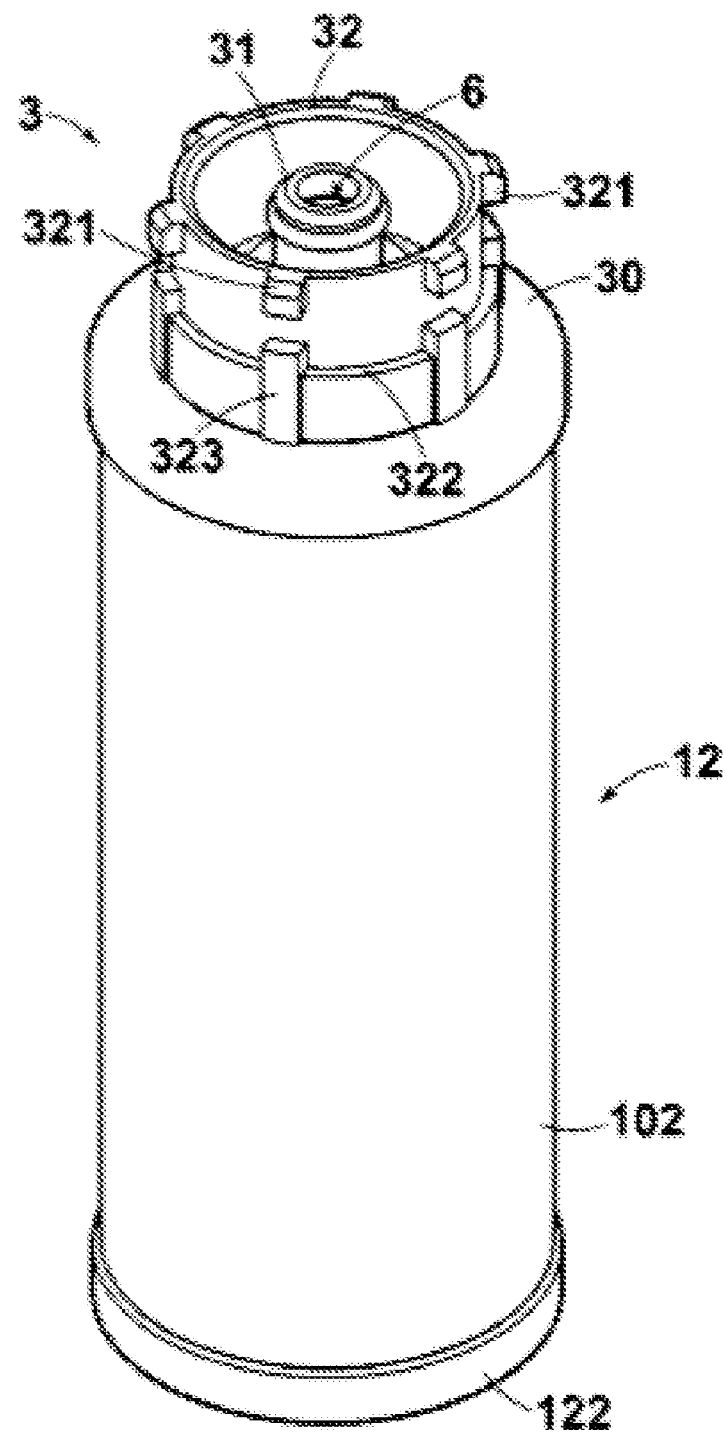
FIG. 3 is a perspective drawing of the pressurized container used as the supply device.
Figure 4:
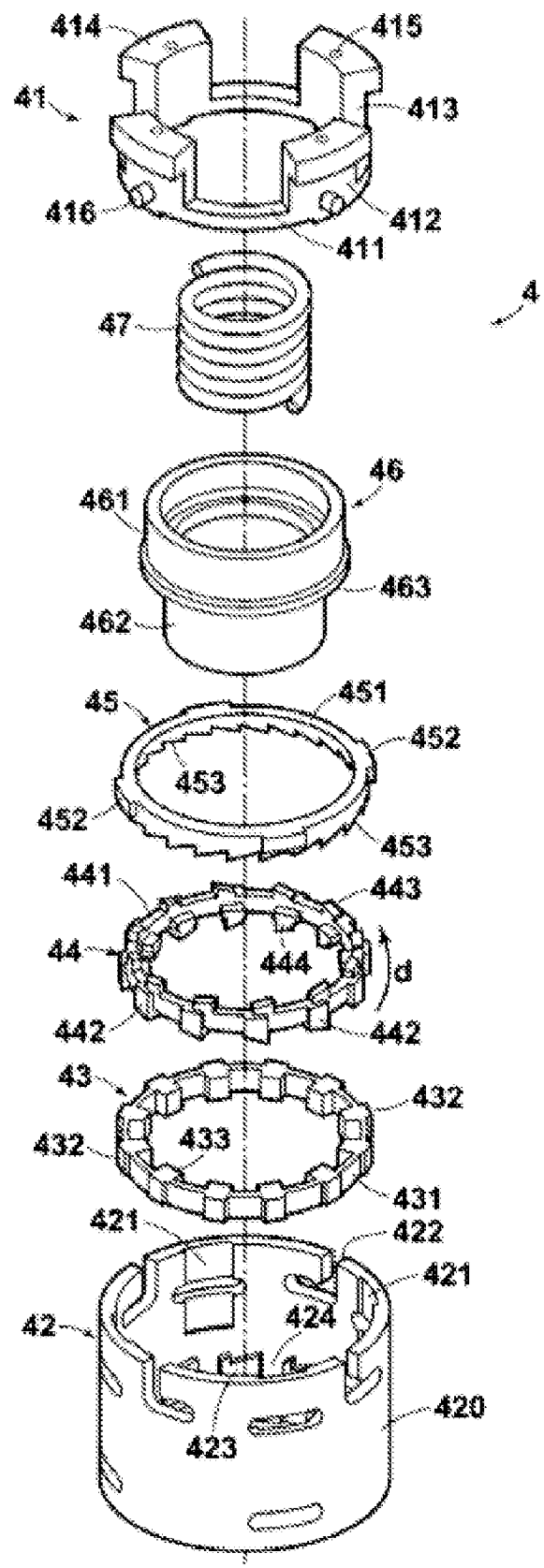
FIG. 4 is an exploded view perspective drawing of the main components of the fastening mechanism.
Figure 5:
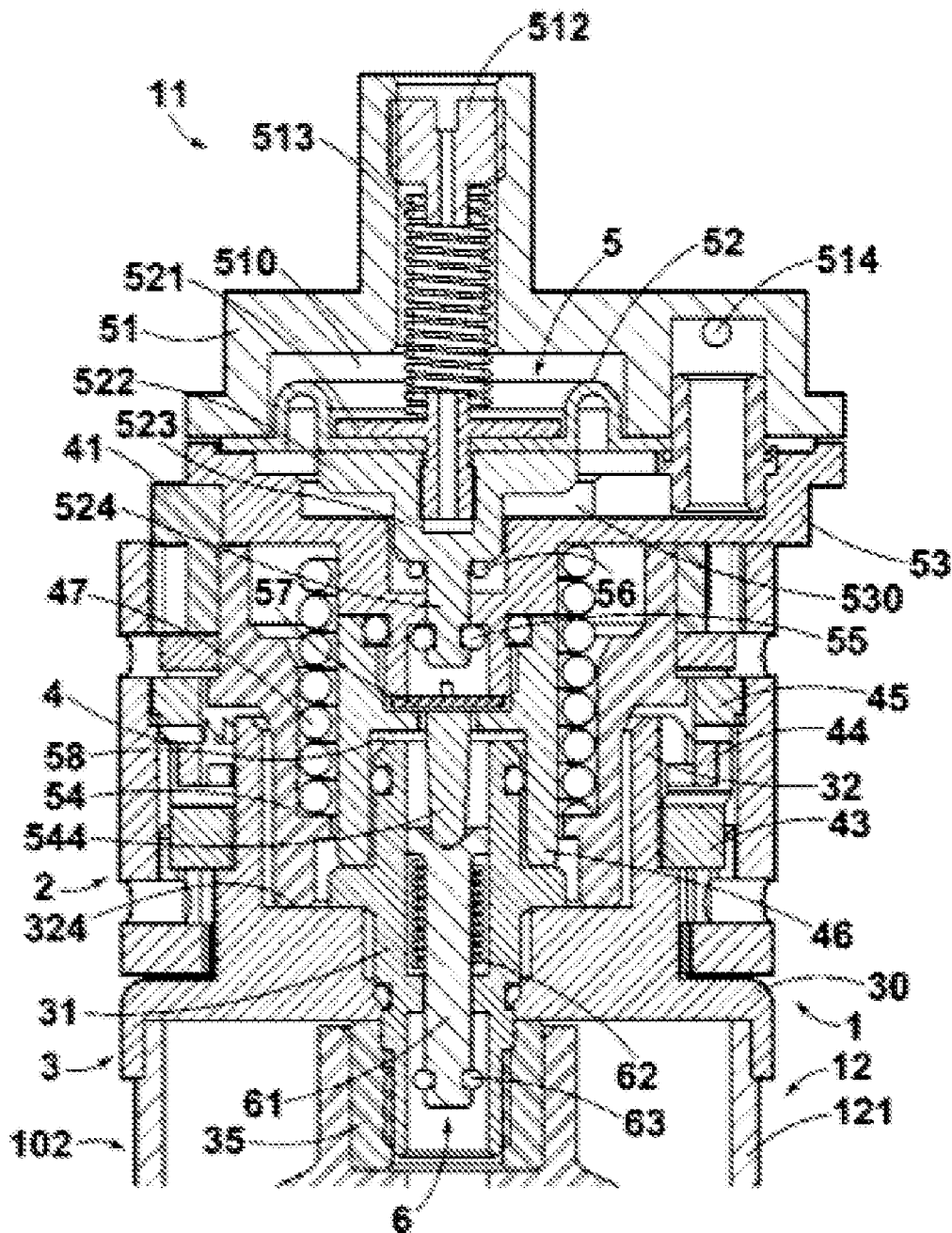
FIG. 5 is a cross section drawing showing the maximum pressed inward condition at connection movement of the supply connector.
Figure 6:
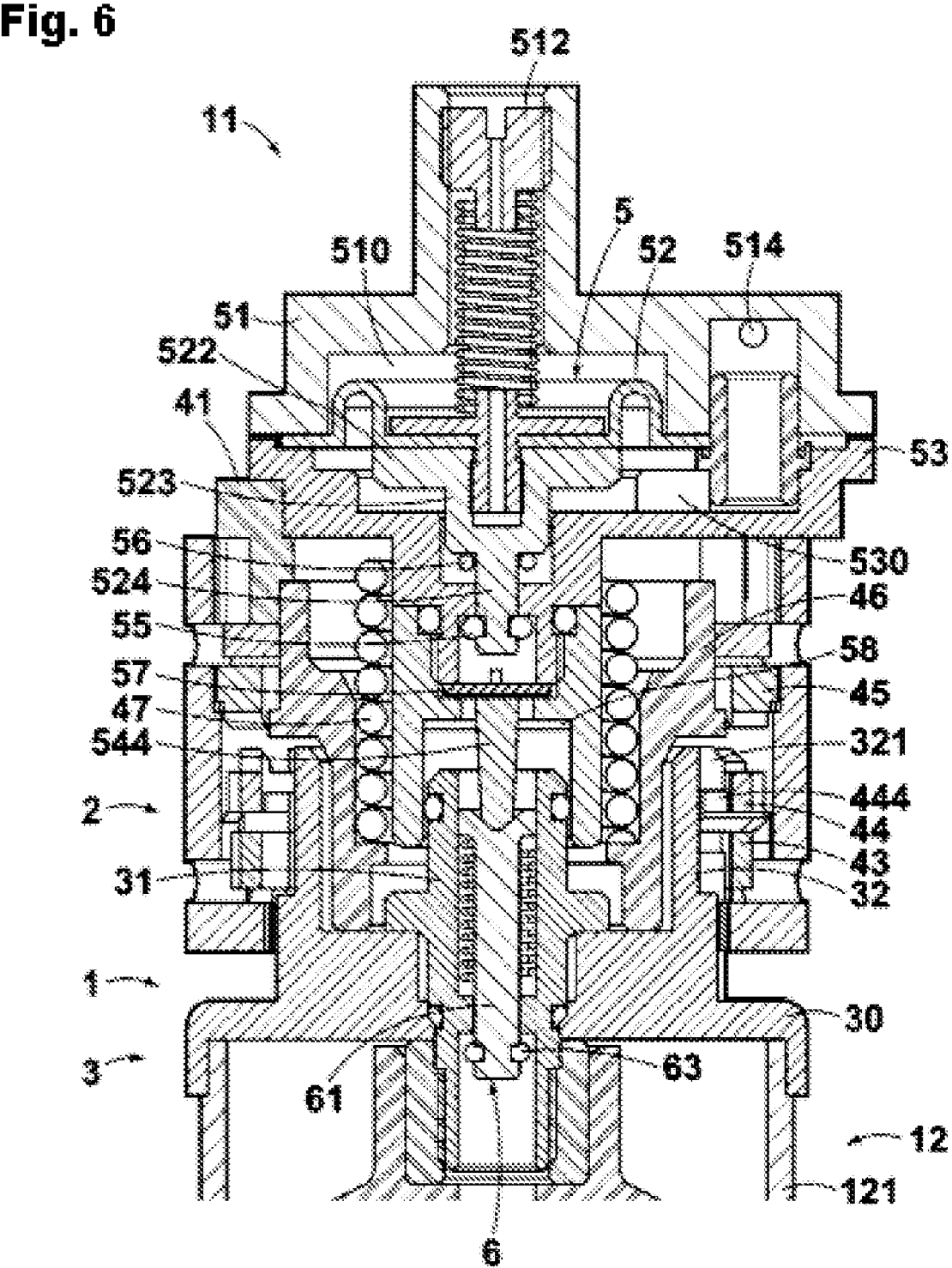
FIG. 6 is a cross section drawing showing the locked condition of the connected supply connector and reception connector.
Figure 7:
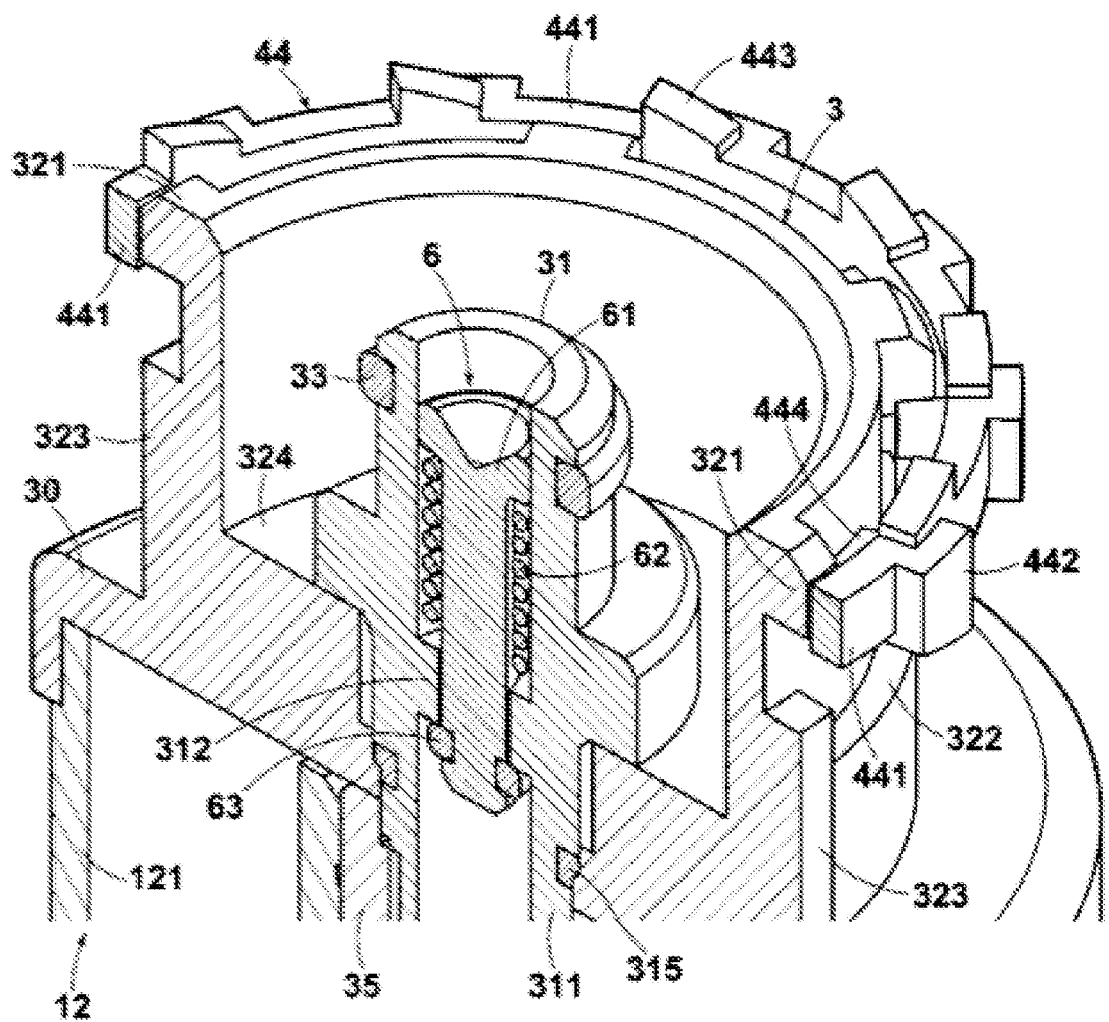
FIG. 7 is cross section perspective drawing showing the relationship between the supply connector and operating member for the lock released condition.
Figure 8:
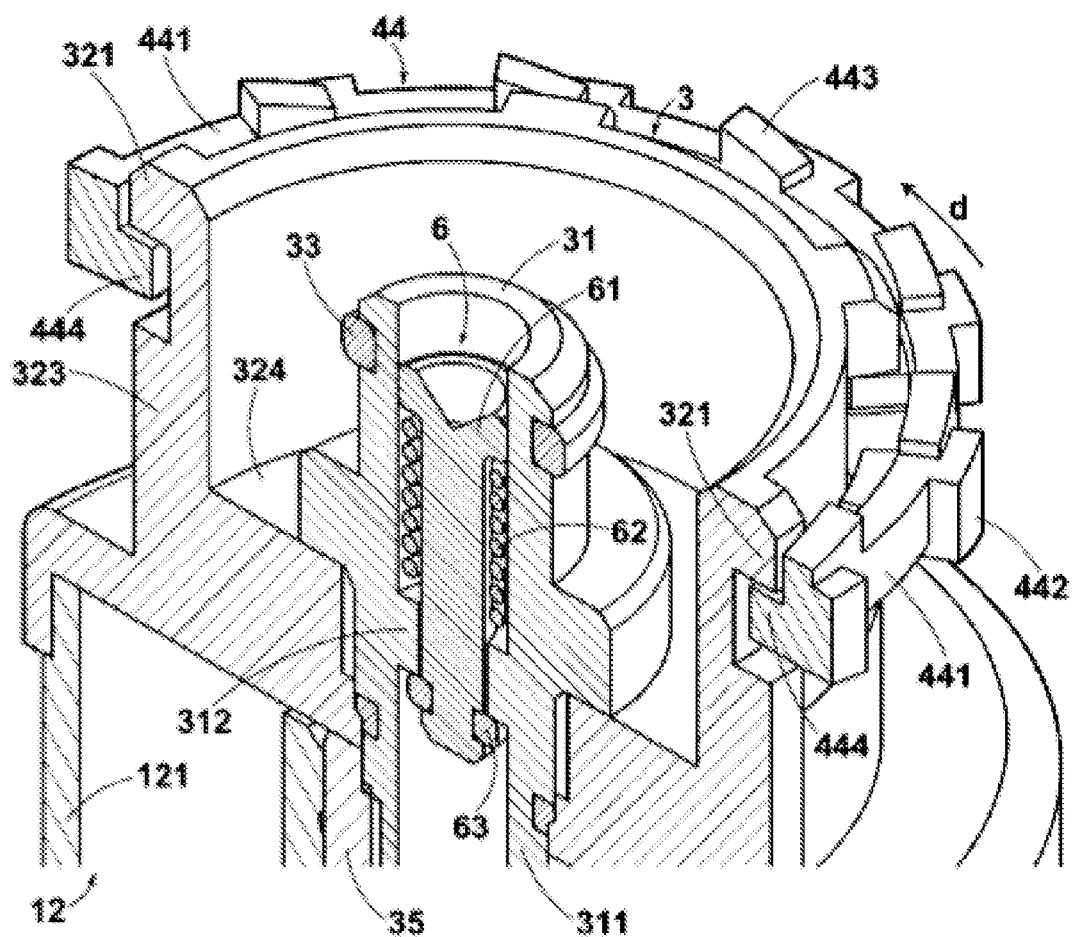
FIG. 8 is a cross section perspective drawing identical to that of FIG. 7 but showing the locked condition.

The following section describes in detail embodiments of this invention. FIG. 1 is a full unit cross section drawing showing the separated condition of the connector structure with the supply connector of the supply device and the reception connector provided with the pressure regulator mechanism according to the first embodiment; FIG. 2 is a main component expanded cross section drawing of the connector structure of FIG. 1; FIG. 3 is a perspective drawing of the pressurized container used as the supply device; FIG. 4 is an exploded view perspective drawing of the main components of the fastening mechanism; FIG. 5 is a cross section drawing showing the maximum pressed inward condition at connection movement of the supply connector; FIG. 6 is a cross section drawing showing the locked condition of the connected supply connector and reception connector; FIG. 7 is cross section perspective drawing showing the relationship between the supply connector and operating member for the lock released condition; FIG. 8 is a cross section perspective drawing identical to that of FIG. 7 but showing shift to the locked condition; and, FIGS. 9~13 are drawings showing the conditions of the fastening mechanism with one portion of the holder omitted. Furthermore, the descriptions that follow are given with reference to the drawings in top-to-bottom and left-to-right orientation, but actual disposition direction may be in horizontal orientation in which the centerline follows a level plane direction rather than the vertical orientation in which the centerline extends in a perpendicular direction (or inversion of top-to-bottom) as shown in FIG. 1.

First Embodiment

Connector structure 1 of the embodiment of FIGS. 1 and 2 comprises reception connector 2 disposed on reception device 11 of such as a fuel cell using a fluid such as liquid fuel and a supply connector 3 disposed on supply device 12 that is such as a fuel cartridge supplying fluid by pressurization, and it connects reception connector 2 and supply connector 3 into a locked condition by use of fastening mechanism 4 (ratchet mechanism) at time of supply of fuel F from supply device 12 to reception device 11. Reception connector 2 provides the main components fastening mechanism 4 and pressure regulator 5 (governor mechanism) for regulating the supply fluid to a fixed secondary pressure. On the opposite side, supply connector 3 provides at supply connection port 31 the plug-shaped valve mechanism 6 possessing valve stem 61 that is forced in the valve closing direction by spring 62. Furthermore, it is preferred that spring 62 and valve stem 61 be of stainless steel because there is liability to corrosion.

Reception device 11 on which reception connector 2 is disposed is an implement having a built-in fuel cell, for example, while supply device 12 on which supply connector 3 is disposed is a pressurized container (fuel cartridge) storing fuel cell fuel fluid, for example, and an explanation follows for the discharge supply of fluid F stored under pressure and the substantive structure.

The structure is such that the leading portion of supply connector 3 is connected by insertion to the interior of reception connector 2, an opening operation is executed by insertion shifting of valve stem 61 of supply connector 3, pressure regulator 5 of reception connector 2 operates corresponding to supply of the pressurized fluid, and the fluid pressure regulated to a fixed secondary pressure is supplied to reception device 11. In addition, these are disposed in a structure such that at the above described connection operation, in conjunction with the pressing inward operation for connection of supply connector 3, second ring 44 acting as the operating member for fastening mechanism 4 shifts and mates to a portion of supply connector 3 and maintains reception connector 2 in a locked condition, and at time of separation, in conjunction with the next pressing inward operation of supply connector 3, second ring 44 acting as the operating member further shifts and modifies the locked condition to a released condition, and reception connector 2 and supply connector 3 are forcibly modified to a separated condition by release spring 47 acting as a force applicator.

Figure 19:
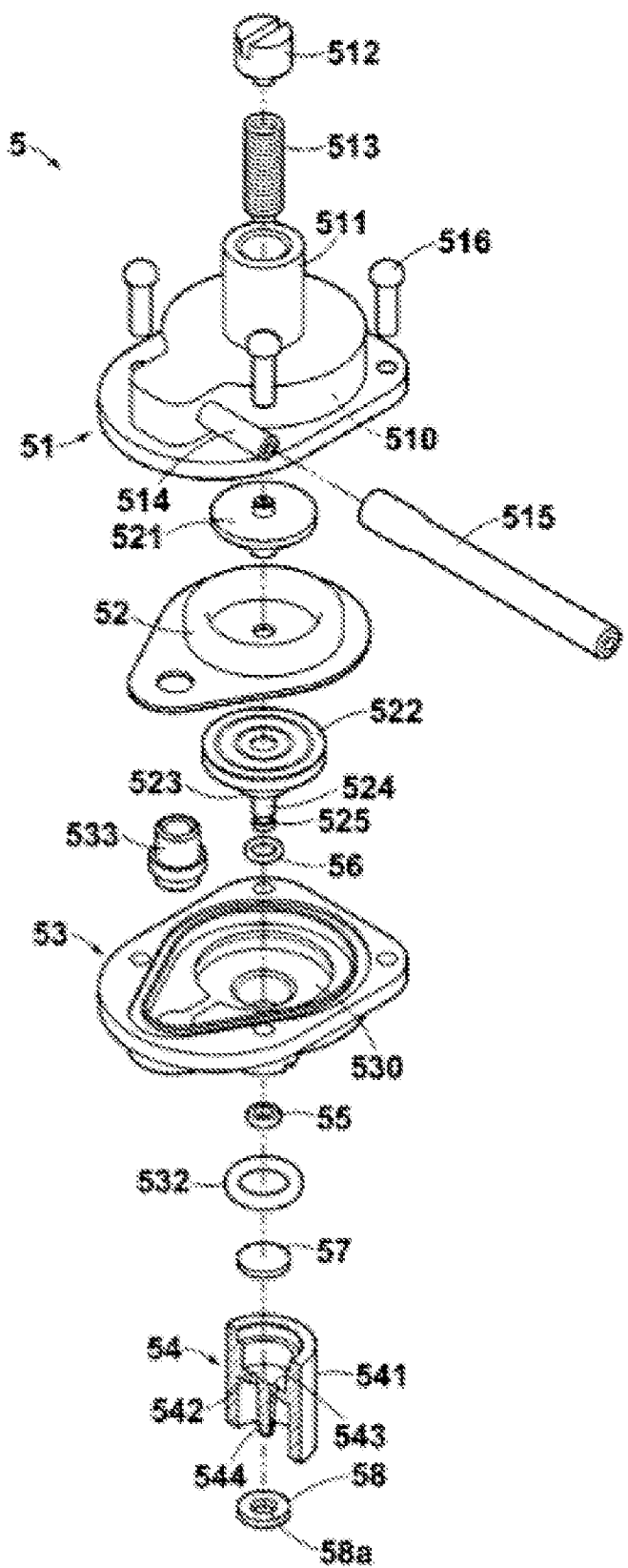
FIG. 19 is an exploded view perspective drawing of the pressure regulator mechanism.

Next, the following section describes specifically the structure of each component. First, as shown in the cross section drawing of FIG. 2 and the exploded view perspective drawing of FIG. 19, pressure regulator 5 provides diaphragm 52 held between cover case 51 and unit case 53, guide member 54 that is connected to unit case 53 and by which is guided the fluid (liquid or gas) of primary pressure, primary regulating valve 55 and secondary regulating valve 56 (low pressure check valve) that perform linked movement with diaphragm 52 and reduce the primary pressure to the secondary pressure, elastic plate 57 (high pressure check valve), and filter 58 for dust removal. Cover case 51 and unit case 53 are reciprocally fastened by such as stainless steel screw 516. Moreover, it is preferred that described cover case 51 and guide member 54 be of polyoxymethylene (POM). Additionally, it is preferred that diaphragm 52, primary regulating valve 55, secondary regulating valve 56 and elastic plate 57 be of ethylene propylene diene methylene (EPDM) for its methanol resistance (against swelling, melting, absorption and hardening), but nitrile rubber (NBR) is acceptable.

Described primary regulating valve 55 and secondary regulating valve 56 perform linked movement in correspondence to displacement of diaphragm 52, are components regulating primary pressure to secondary pressure by reciprocally opposing closing movement, and the regulating properties for primary pressure change become opposite properties with each of primary regulating valve 55 and secondary regulating valve 56. In this way, at diaphragm 52 the pressure loss operated by primary pressure on the reflection surface of primary regulating valve 55 and the pressure loss operated by secondary pressure on the reflection surface of secondary regulating valve 56 are added in the same direction, and by the combination of both regulating properties regulating error within the secondary pressure is compensated by the pressure loss fluctuation corresponding to primary pressure fluctuation, and this obtains a fixed secondary pressure. Furthermore, primary regulating valve 55 and secondary regulating valve 56 perform opening and closing operations in opposition to the displacement of diaphragm 52, and they are intended to simplify manufacturing by canceling out regulating fluctuations due to installation position error of either member and by relieving production precision.

Fastening mechanism 4 is disposed on the periphery of guide member 54 of pressure regulator 5, and, as shown in FIG. 2, this fastening mechanism 4 provides holder unit 41 and ratchet holder 42 affixed to described unit case 53, first ring 43, second ring 44 and third ring 45 disposed within ratchet holder 42, spring holder 46 that slides freely in the axial direction, and release spring 47. It is preferred that holder unit 41, ratchet holder 42, first ring 43, third ring 45 and spring holder 46 be of polyoxymethylene (POM).

Second ring 44 rotates by one increment corresponding to the connection movement of described supply connector 3 and performs mating lock for supply connector 3, and by the next pressing inward movement of supply connector 3, second ring 44 further rotates by one increment and releases mating lock, and supply connector 3 is forcibly separated by the application force of release spring 47. The one increment forwarding described above is performed such that force is operated in the rotation direction by pressing pressure on the inclined surfaces between the rings.

Supply connector 3 disposed at the top of supply device 12 provides connection port 31 with built-in valve mechanism 6 at the center of connector unit 30, and it possesses connection cylinder 32 at the periphery of connection port 31 and protruding outward in the axial direction. It is preferred that connector unit 30 be of polycarbonate (PC) and that connection port 31 be of polyoxymethylene (POM). As shown in FIG. 3, there are provided mating protrusions 321 used as lock mating components protruding at equal intervals from the leading edge periphery of connection cylinder 32, and they are capable of mating with lock protrusions 444 of second ring 44. Furthermore, the cross section position for connection cylinder 32 differs in FIGS. 1 and 2.

At a prescribed position from the leading edge of connection cylinder 32, pressing shoulder 322 protrudes in an annular shape to the outer side, and as described hereafter, it contacts against inner protrusions 433 of first ring 43 and causes shifting in the axial direction corresponding to connection movement. In addition, spline-shaped protrusions 323 protrude from pressing shoulder 322 toward mating protrusions 321, and along with the formation of an annular space between these and mating protrusions 321 for rotational movement of second ring 44, these prevent other rotation by mating with vertical channels 426 at the lower periphery of ratchet holder 42 of reception connector 2.

Connection port 31 is formed in a pipe shape, seal member 33 of an O-ring is installed at the leading edge periphery, nut 35 is installed and tightened on lower end 311 passed through connector unit 30, and valve stem 61 of valve mechanism 6 is disposed to slide freely at the inner periphery of intermediate step 312. Lower end 311 and connector unit 30 are sealed by O-ring 315 disposed within the peripheral channel of lower end 311. Moreover, it is preferred that O-ring 315 be of ethylene propylene diene methylene (EPDM) and coated with poly tetrafluoro ethylene (PTFE). Valve body 63 of an O-ring is installed at the lower end of valve stem 61 and protrudes beyond intermediate step 312. The indentation in the top of valve stem 61 is able to contact against the leading edge of linking protrusion 544 of guide member 54, and spring 62 (return spring) is installed with compression between the underside of the top section and intermediate step 312 and applies force in the valve closed direction.

Next, the following section describes the structure of fastening mechanism 4 in reception connector 2 by reference to FIGS. 2 and 4. Ratchet holder 42 shown at the lower side of FIG. 4 is formed in an annular shape, and it is fixed to holder unit 41 shown at the upper side of the same drawing by the upper edge of cylinder 420. At the inner surface of cylinder 420 of ratchet holder 42 there are provided four peripheral direction first guide channels 421 positioned at an approximately intermediate position from the opposite end of an extension in the axial direction, L-shaped mating channels 422 passing from interior to exterior from the upper edge surface and positioned between first guide channels 421, ratchet protrusions 423 (reference FIG. 9) disposed in multiple quantity (12 protrusions) at equal intervals of the inner periphery at the lower side, and second guide channels 424 in multiple quantity (12 channels) at equal intervals of the inner peripheral surface between ratchet protrusions 423 and extending in the axial direction, and there are at the upper end of ratchet protrusions 423 inclined surfaces 423a and stop steps 423b (reference FIG. 9), and the upper surfaces of stop steps 423b are inclined identically to inclined surfaces 423a and also face second guide channels 424.

First ring 43 (slide ring) provides guide protrusions 432 of multiple quantity (12 protrusions) at equal intervals on the outer periphery of ring base 431 and provides inner protrusions 433 on the inner periphery at positions matching guide protrusions 432. Guide protrusions 432 of the periphery are at ordinary time inserted within second guide channels 424 of ratchet holder 42, and this first ring 43 does not rotate but shifts only upward or downward. At the lower surfaces of inner protrusions 433, the upper edge of pressing shoulder 322 of connection cylinder 32 of supply connector 3 is able to make contact when raised, and that pressing pressure raises first ring 43 in the axial direction. Furthermore, mating protrusions 321 of connection cylinder 32 are capable of insertion passage through the vertical channels between the inner protrusions 433.

Second ring 44 (lock ring) provides guide protrusions 442 of multiple quantity (12 protrusions) at equal intervals on the outer periphery of ring base 441, slide hooks 443 with inclined surfaces of multiple quantity (12 hooks) at equal intervals on the upper surface, and lock protrusions 444 of multiple quantity (12 protrusions) projecting at equal intervals from the inner periphery, and it executes rotation movement in rotation direction d. Guide protrusions 442 of the outer periphery and lock protrusions 444 of the inner periphery are identically positioned in the peripheral direction, and both are linked at the bottom section of ring base 441, and these bottom common sections are established with the sides facing the forward direction of rotation direction d higher and the sides facing the backward direction lower. In addition, the upper surfaces of slide hooks 443 projecting from the upper surface are established with sides facing the forward direction of rotation direction d higher and the sides facing the backward direction lower.

Guide protrusions 442 of the outer periphery are inserted into second guide channels 424 of ratchet holder 42 and they guide the sliding movement of second ring 44 in the axial direction, and at large upward movement of second ring 44, guide protrusions 442 exit second guide channels 424 and second ring 44 becomes capable of rotation. Due to rotation, when the lower edge inclined surfaces of guide protrusions 442 descend in a condition capable of contacting inclined surfaces 423a or the upper edge inclined surfaces of stop steps 423b of ratchet protrusions 423, there is further rotation by contact of these companion inclined surfaces, and therefore either the leading edges of guide protrusions 442 enter a locked condition by having mated with stop steps 423b or guide protrusions 442 enter a separated condition by having inserted into second guide channels 424, and rotation stops. In addition, by the rotation movement in conjunction with the connection movement, lock protrusions 444 of the inner periphery shift to the inner side of mating protrusions 321 used for locking by connection cylinder 32 of supply connector 3 and are capable of the mating lock condition.

Third ring 45 (guide ring) provides four guide protrusions 452 at equal intervals of the outer periphery of ring base 451 and hooking teeth 453 having inclined surfaces of ratchet hook shape on the lower surfaces. Guide protrusions 452 are inserted into first guide channels 421 of ratchet holder 42, and third ring 45 is capable of upward and downward shifting in the axial direction (rotation not possible), and the bottom end position is limited by guide protrusions 452 mating against the lower edge of first guide channels 421 so that it separates from second ring 44. Hooking teeth 453 at the lower surface contact slide hooks 443 on the upper surface of second ring 44 and cause rotation of second ring 44 by the contact of the companion inclined surfaces.

Spring holder 46 comprises annular-shaped upper cylinder 461 and comparatively smaller diameter lower cylinder 462, and release spring 47 is installed with compression within, and outer periphery shoulder 463 at the lower end of upper cylinder 461 contacts and applies force from the upper direction onto lock protrusions 444 of second ring 44. In this way, floating movement is prevented when second ring 44 separates from third ring 45.

In addition, lower cylinder 462 of spring holder 46 is inserted within first through third rings 43~45 and extends downward within ratchet holder 42, and it possesses an opening in the bottom center that receives release spring 47, and connection port 31 of supply connector 3 is inserted within the opening. Furthermore, the lower end of lower cylinder 462 is capable of contacting interior surface 324 of connector unit 30 of supply connector 3, and this enables upward shifting movement by the resistance of spring holder 46 against release spring 47 by the connection movement of supply connector 3.

Release spring 47 is a coil spring installed with compression between the lower surface flanges of unit case 53 of reception connector 2, and it passes through spring holder 46 and presses against third ring 45 and applies force on supply connector 3 disconnection and separation direction.

Holder unit 41 is fixed to diaphragm 52 and fastened to unit case 53 of reception connector 2. Ring section 411 at the bottom end consolidates the unit, there are provided four fixed sections 412 extending upward at equal intervals and vertical channels 413 between fixed sections 412, screw holes 415 are formed in flanges 414 protruding outward at the upper edge of fixed sections 412, and four pin protrusions 416 protrude outward one each from the outer surface of each of fixed sections 412 below flanges 414. Pin protrusions 416 are capable of mating with L-shaped mating channels 422 of ratchet holder 42, thereby enabling assembly.

The following section describes specifically the structure of pressure regulator 5. By joining unit case 53 and cover case 51 around diaphragm 52, there is formed regulation chamber 530 and atmospheric chamber 510 within the interior space. Diaphragm 52 is capable of elastic displacement corresponding to the pressure difference between atmospheric chamber 510 and the received secondary pressure of regulation chamber 530, and in the center area, supporter 521 is fastened to atmospheric chamber 510 and on the other side shaft 522 is fastened to regulation chamber 530, and they are capable of integrally shifting in the axial direction corresponding to displacement of diaphragm 52. It is preferred that supporter 521 and shaft 522 be of polyoxymethylene (POM).

Shaft 522 provides boss 523 fastened to diaphragm 52 and positioned in regulation chamber 530 and provides shank 524 extending in the axial direction from the leading edge of boss 523, and it possesses a peripheral channel at the leading edge of shank 524, and primary regulating valve 55 of an O-ring is installed in the channel, and furthermore, secondary regulating valve 56 of an O-ring (elastic body) is installed at the leading edge surface of boss 523 as a base component of shank 524.

The bolt section in the center of the supporter 521 flange firmly fastened to diaphragm 52 passes through the center of diaphragm 52 and is tightened securely to shaft 522 on the opposite side. In addition, one end of regulator spring 513 disposed within cylinder section 511 of cover case 51 and used for pressure setting contacts supporter 521, and the other end of regulator spring 513 contacts regulator screw 512 (adjustor) which is screwed into cylinder section 511 and capable of position adjustment, and corresponding to adjustment of the axial direction position of regulator screw 512, there is adjustment of the application force of diaphragm 52 by regulator spring 513. It is preferred that regulator screw 512 be of polyoxymethylene (POM) and regulator spring 513 be of stainless steel.

Guide member 54 of the lower section provides cylinder section 541 at the periphery, barrier wall 542 at the median, linking protrusion 544 that protrudes downward from barrier wall 542, and passage holes 543 that pass through barrier wall 542 on either side of linking protrusion 544.

On the upper surface of barrier wall 542 of guide member 54 and with capability to block the opening of passage hole 543 is disposed elastic plate 57 of such as a rubber plate or sandwich plate for high pressure blocking. When supply connector 3 has been separated with the secondary pressure of regulation chamber 530 in a relatively high condition, that secondary pressure causes elastic plate 57 to function as a reverse check valve to block passage hole 543, and this prevents fluid from leaking to the outside.

The upper end of cylinder section 541 of guide member 54 passes around O-ring 532 of such as ethylene propylene diene methylene (EPDM) and is joined with removable capability to the periphery of the leading edge cylinder section of unit case 53, and the opposite end of cylinder section 541 mates to seal member 33 at the forward end periphery of connection port 31 of supply connector 3 and guides the pressurized fluid.

Unit case 53 provides partition wall 531 within the leading edge cylinder section, inserted with capability to allow slide movement for shank 524 of shaft 522, and the interior and exterior of partition wall 531 is opened and closed by primary regulating valve 55 and secondary regulating valve 56. Opposing open and close movements are executed by primary regulating valve 55 opening in conjunction with forward shifting of shank 524 and by secondary regulating valve 56 opening in conjunction with rearward shifting. In addition, when supply connector 3 has been separated with the pressure of regulation chamber 530 in a low condition, secondary regulating valve 56 functions as a check valve to block the reverse flow of fluid by closing due to secondary pressure.

Discharge port 514 for discharging regulated secondary pressure gas that passes through cylinder section 533 is disposed within the interior of regulation chamber 530, and pipe 515 that leads regulated fluid to reception device 11 is connected to discharge port 514. It is preferred that cylinder section 533 be of polyoxymethylene (POM). In addition, it is preferred that pipe 515 be of a silicone rubber for its chemical durability and pliability, but it is acceptable to use an inexpensive urethane rubber when methanol concentrations will be less than approximately 40%.

When supply connector 3 is connected to reception connector 2, the leading edge of previously described linking protrusion 544 of presses against valve stem 61 and causes the opening operation. Linking protrusion 544 is fastened to barrier wall 542 of guide member 54 and is of a structure separated from shank 524 executing linked movement with diaphragm 52, and at connection movement it does not receive force from the displacement of diaphragm 52. Rephrased, the leading edge of shank 524 is capable of causing a linking operation with valve stem 61, and in that event, when pressing inward force is maintained so the maximum pressing inward condition is continued, that action causes loss of regulating function by diaphragm 52 displacement, and there is concern that fluid under pressure higher than the set secondary pressure will be supplied, but by separating linking protrusion 544 from diaphragm 52, it is possible to maintain the regulating function and prevent supply of fluid under pressure higher than the set secondary pressure.

At the lower surface of barrier wall 542 of guide member 54, filter 58 is interposed to remove foreign objects such as dust from within the supplied fluid. Filter 58 is of a circular plate shape possessing hole 58a, and its outside diameter is formed to be slightly larger than the outside diameter of barrier wall 542, and additionally, its inside diameter to be slightly smaller that the base diameter of linking protrusion 544, and by insertion installation from beneath guide member 54 it is firmly installed to prevent falling.

The material of this filter 58 is a low density polyethylene (LDPE) foam substance of 85% void, cell average diameter 30 micrometers and thickness 1 mm, for example, although another material could be used. By firmly installing filter 58 within the fluid route, there is prevented the mixing of minute debris existing in the supply fluid, and along with preventing the generation of poor results in the opposing flow prevention operation of such as elastic plate 57, it prevents the generation of poor movement of the operational members of reception device 11.

Next, the following section describes the structure of supply device 12. Supply device 12 comprises container unit 102 of such as polycarbonate (PC) and disposed at the head of connector unit 30 of supply connector 3, storage chamber 103 storing fluid F and formed in the interior of container unit 102, gas chamber 104 enclosing pressurized gas G reactive force for pressing out fluid F and formed in the interior of container unit 102 and reciprocally linking storage chamber 103 at the end, barrier wall 105 of piston shape for dividing fluid F from gas G and disposed to slide freely in storage chamber 103, and elastic body 108 of such as stainless steel and compressed at the bottom section of container unit 102 when barrier wall 105 has descended.

Container unit 102 is structured of outer container 121, cover 122 sealing closed the bottom, and inner container 123 disposed with a double construction in the interior of outer container 121. At the lower end of inner container 123, notch 111 is formed extending in a vertical direction, and it enables passage between the interior of inner container 123 and the interior of outer container 121, which is storage chamber 103 and gas chamber 104. The upper end of inner container 123 is installed with mating to nut 35 fastened to lower end 311 of connection port 31, and inner container 123 is maintained in this condition. In the center of the upper end of inner container 123 there is opened passage hole 123a, and corresponding to the opening and closing movements of valve stem 61 of valve mechanism 6, discharge supply of fluid F within storage chamber 103 is performed. Moreover, it is preferred that cover 122 be of polycarbonate (PC), inner container 123 be of polypropylene (PP), and nut 35 be of polyoxymethylene (POM).

In addition, barrier wall 105 is inserted with close fitting and capable of sliding, it is structured of main unit 151 and elastic seal member 152 (O-ring), and the periphery of seal material 152 contacts the cylindrically shaped inner wall of inner container 123 with air tightness, and fluid F is enclosed in storage chamber 103 in the space above it. Barrier wall 105 functions as a sliding barrier that divides the pressurized gas stored in gas chamber 104 from the fluid F stored in storage chamber 103, and by the pressure of the compressed gas operating on the rear surface it applies pressure to fluid F at the forward surface, and at opening operation by valve stem 61, it operates to discharge fluid F. Furthermore, it is preferred that seal material 152 be of ethylene propylene diene methylene (EPDM) coated with poly tetrafluoro ethylene (PTFE) in order to increase sliding efficiency.

The enclosure of pressurized gas G within gas chamber 104 is performed with supply connector 3 in a separated condition and prior to injection of fluid F to storage chamber 103. First, compressed gas G passes valve stem 61 that has undergone opening operation by a pressing inward operation, and corresponding to its entry to storage chamber 103, barrier wall 105 descends, and by further injection of the compressed gas to storage chamber 103, barrier wall 105 further shifts from the position shown by FIG. 1 to the bottom of storage chamber 103 by compressing elastic body 108. In maximum descent condition, the upper portion of notch 111 rises above seal material 152 of barrier wall 105, and the pressurized gas is injected to gas chamber 104 from storage chamber 103 by passing through notch 111. After stoppage of compressed gas injection at time gas chamber 104 reaches a prescribed pressure, valve stem 6 undergoes opening operation again and compressed gas within storage chamber 103 is expelled. In response, barrier wall 105 returns to a seal condition within storage chamber 103, and by further expulsion of gas it ascends to the upper end of inner container 123, and by expelling all gas within storage chamber 103, compressed gas G is enclosed within gas chamber 104. After this, by connecting a filling means to supply connector 3 and injecting fluid F past valve stem 61 and into storage chamber 103, thereby causing barrier wall 105 to descend, it is possible to obtain supply device 12 storing fluid F capable of discharge.

Moreover, it is also acceptable to store a compressed gas as a fluid within supply device 12, and in such an instance the gas is stored directly n the outer container without utilizing the inner container. Additionally, it is acceptable to obtain internal pressure (primary pressure) for discharging supply fluid by using a so-called aerosol structure with dispersal material mixed with the fluid.

Basically, with the connection operation of described supply connector 3 with reception connector 2, there can be performed insertion of connection port 31 of supply connector 3 into guide member 54 of reception connector 2 and obtaining of a sealed condition by contact of seal member 33, enabling of supply by causing linkage of the passage for fluid by opening operation of valve mechanism 6 of supply connector 3, and locking by fastening mechanism 4.

The order of operation at time of connection (installation) is that seal member 33 first contacts the inner surface of cylinder section 541 of guide member 54, and after sealing is assured, valve stem 61 of valve mechanism 6 is opened by the leading edge of linking protrusion 544, following which second ring 44 of fastening mechanism 4 rotates and enters the locked condition. Conversely, the order at time of release (disconnection) is that second ring 44 of fastening mechanism 4 rotates and the locked condition is released, following which valve stem 61 closes and blocks the passage, and lastly seal member 33 is separated from guide member 54 and released.

Next, the following section describes the connection of supply connector 3 to reception connector 2 by referencing FIG. 5~8 and the movement of fastening mechanism 4 referencing FIGS. 9~13. Moreover, FIGS. 9~13 omit cylinder 420 of ratchet holder 42 while leaving ratchet protrusions 423, and they show the relationship of ratchet protrusions 423 with first ring 43 and with second ring 44 occurring at the inner surface.

Figure 9:
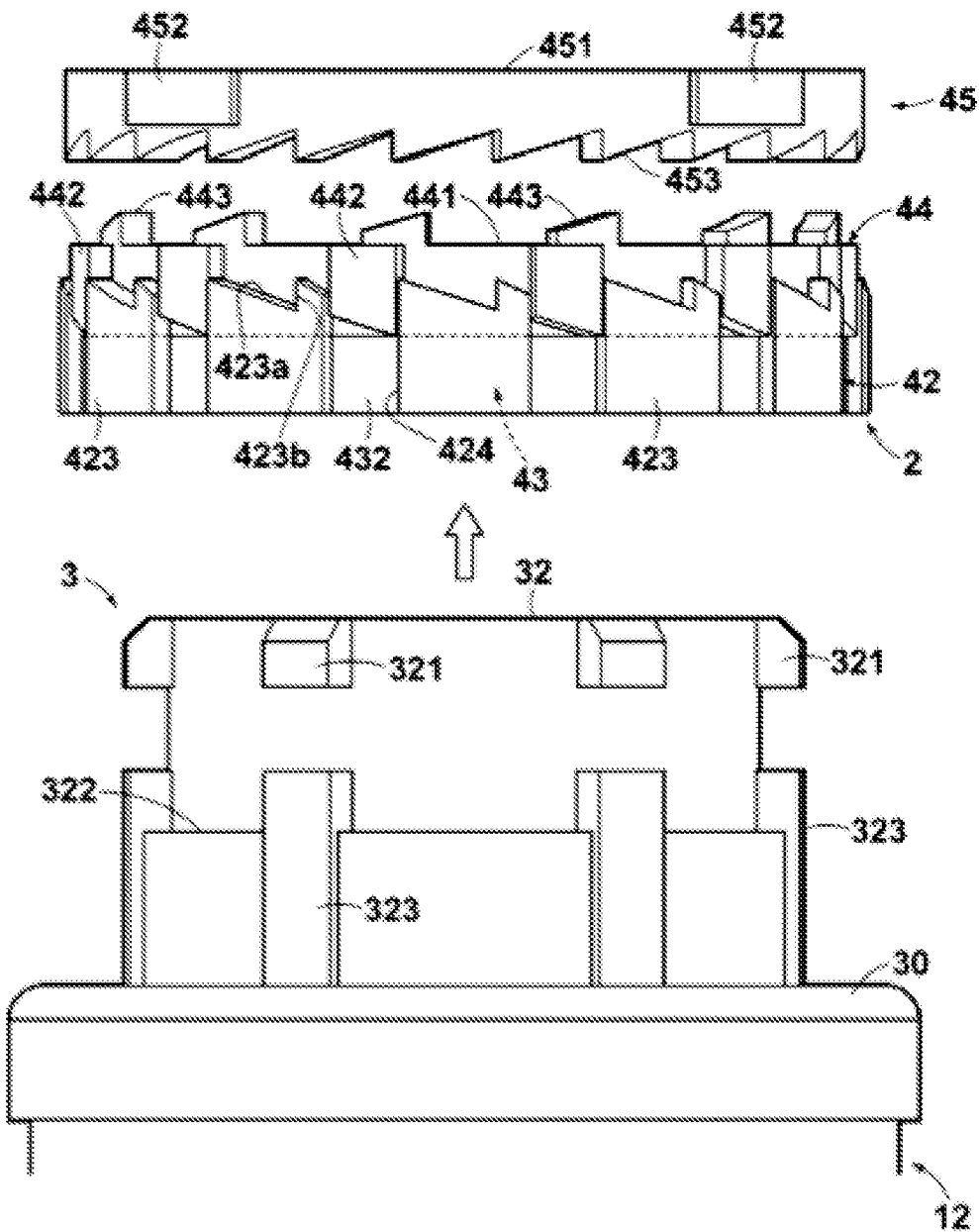
FIG. 9 is a drawing showing the condition of the fastening mechanism before connection with one portion of the holder omitted.

In the separated condition prior to connection, as shown in FIGS. 2 and 9, outer periphery shoulder 463 of spring holder 46 of fastening mechanism 4 contacts and applies pressure on lock protrusions 444 of second ring 44, guide protrusions 432 of first ring 43 and guide protrusions 442 of ratchet holder 42 are located within second guide channels 424 of ratchet holder 42, second ring 44 is incapable of rotation, and third ring 45 is in a position at which the descent position is restricted. In this condition, secondary regulating valve 56 (reverse check valve) of pressure regulator 5 closes, and valve stem 61 of supply connector 3 closed condition.

Figure 10:
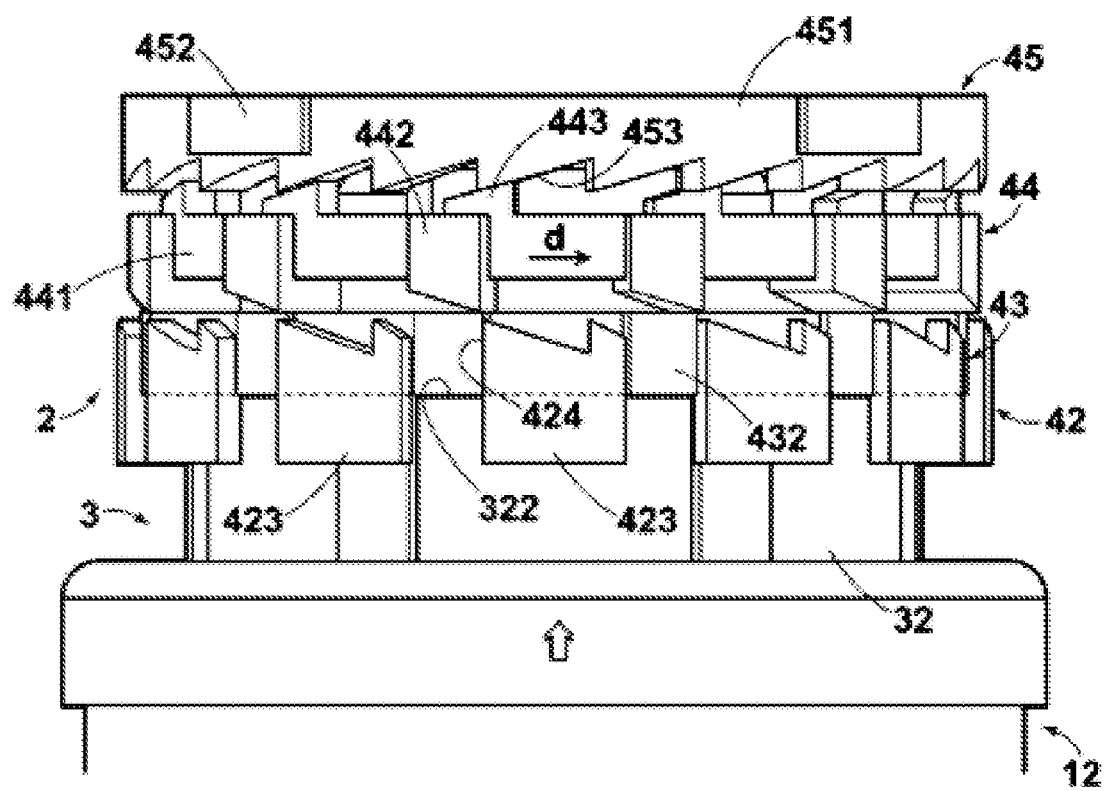
FIG. 10 is a drawing identical to that of FIG. 9 but showing the initial condition at which the supply connector has been pressed into the reception connector.

In response to pressing inward movement of supply connector 3, as shown in FIG. 10, the initial stage is one in which mating protrusions 321 used for locking of connection cylinder 32 shift and pass through the vertical channels of first ring 43 and second ring 44, the lower end of spring holder 46 contacts interior surface 324 of supply connector 3 and continues to press upward, and pressing shoulder 322 contacts and presses upward against the lower surface of first ring 43. In conjunction with this, second ring 44 also ascends, and it contacts the lower surface of third ring 45 stopping at the lower end of first guide channels 421. During transit, as shown in FIG. 10, guide protrusions 442 of second ring 44 depart from the upper end of second guide channels 424 of ratchet holder 42 and become capable of rotation, and by contact with the inclined surfaces of hooking teeth 453 on the bottom surface of third ring 45, second ring 44 receives force in rotation direction d.

FIG. 5 shows the maximum pressed inward condition of supply connector 3, and in this condition the upward movement of third ring 45 is restricted, second ring 44 is rotated in rotation direction d above first ring 43 by inclined surface contact with third ring 45, and as shown in FIG. 8, at rotation of second ring 44, lock protrusions 444 shifts and mates with the inner side of mating protrusions 321 for locking of connection cylinder 32 of supply connector 3 and locks with inability to shift for detachment. In the condition of FIG. 5, linking protrusion 544 causes valve stem 61 to undergo an opening operation and commence supply of fluid.

Figure 11:
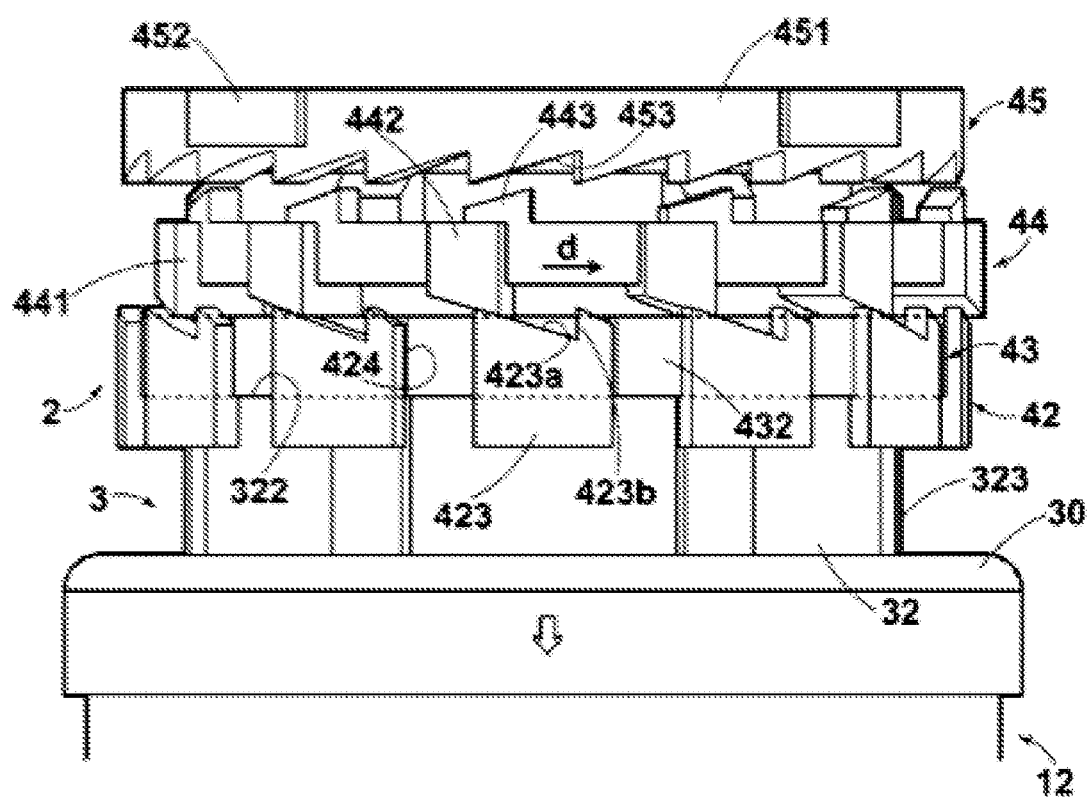
FIG. 11 is a drawing identical to that of FIG. 9 but showing the initial condition at which pressing inward has released the supply connector.

Subsequently, from the maximum pressed inward condition, at release of the pressing inward movement, supply connector 3 is applied with force for retreat by the application force of release spring 47, while mating protrusions 321 for locking of connection cylinder 32 of supply connector 3 mate with lock protrusions 444 of second ring 44 and shift downward, and third ring 45 and first ring 43 integrally shift downward. Then, as shown in FIG. 11, when third ring 45 descends and stops at the lower ends of first guide channels 421, previously separated second ring 44 further descends, thereby causing the contact of the inclines of both sides to become separated, and by the above described second ring 44 rotation, the leading edges of guide protrusions 442 of the lower edge shift from the position of second guide channels 424 to one above inclined surfaces 423a of ratchet protrusions 423, contact the inclined surfaces 423a, and by further descent of second ring 44 additionally rotate along the inclines.

Figure 12:
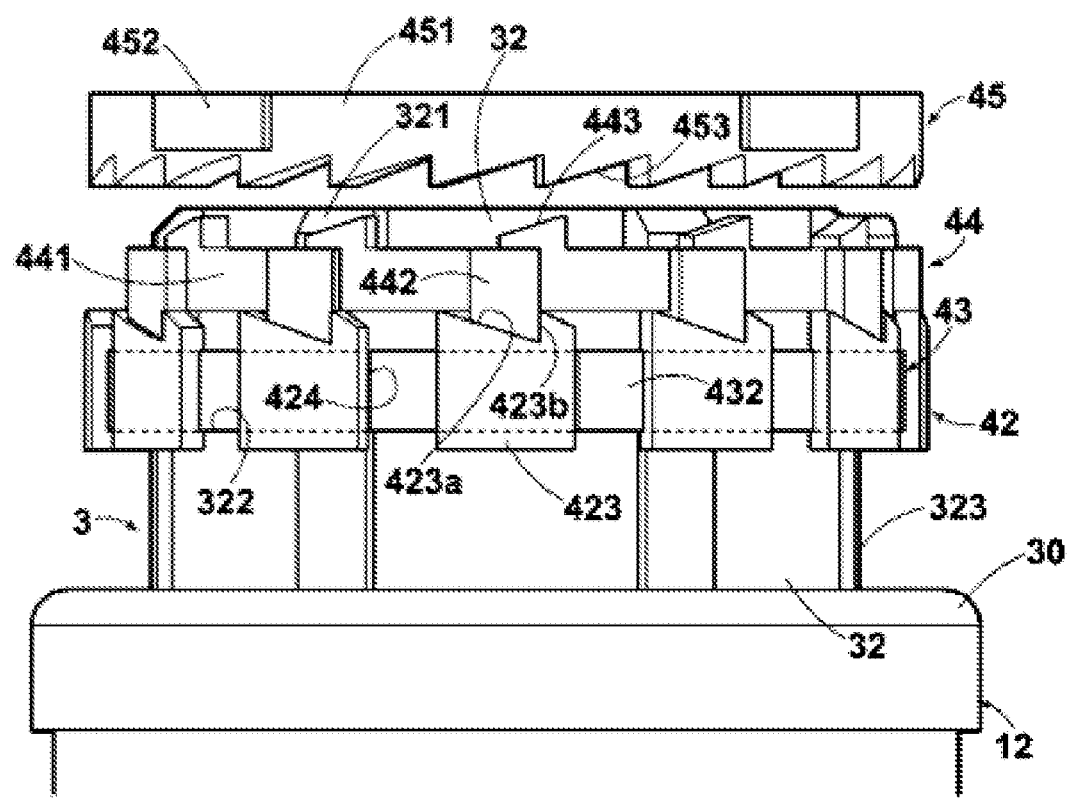
FIG. 12 is a drawing identical to that of FIG. 9 but showing the locked condition at which the supply connector has mated to the reception connector.

Then, as shown in FIG. 12, guide protrusions 442 of second ring 44 contact against stop steps 423b and stop rotation, and descent beyond that point is stopped, and supply connector 3 mating with lock protrusions 444 of second ring 44 is locked, resulting in the locked condition being connected and unable to separate.

FIG. 6 is a cross section drawing of the locked condition, with pressure regulator 5 operating and fluid regulated to the prescribed pressure being supplied to reception device 11 from discharge port 514.

Figure 13:
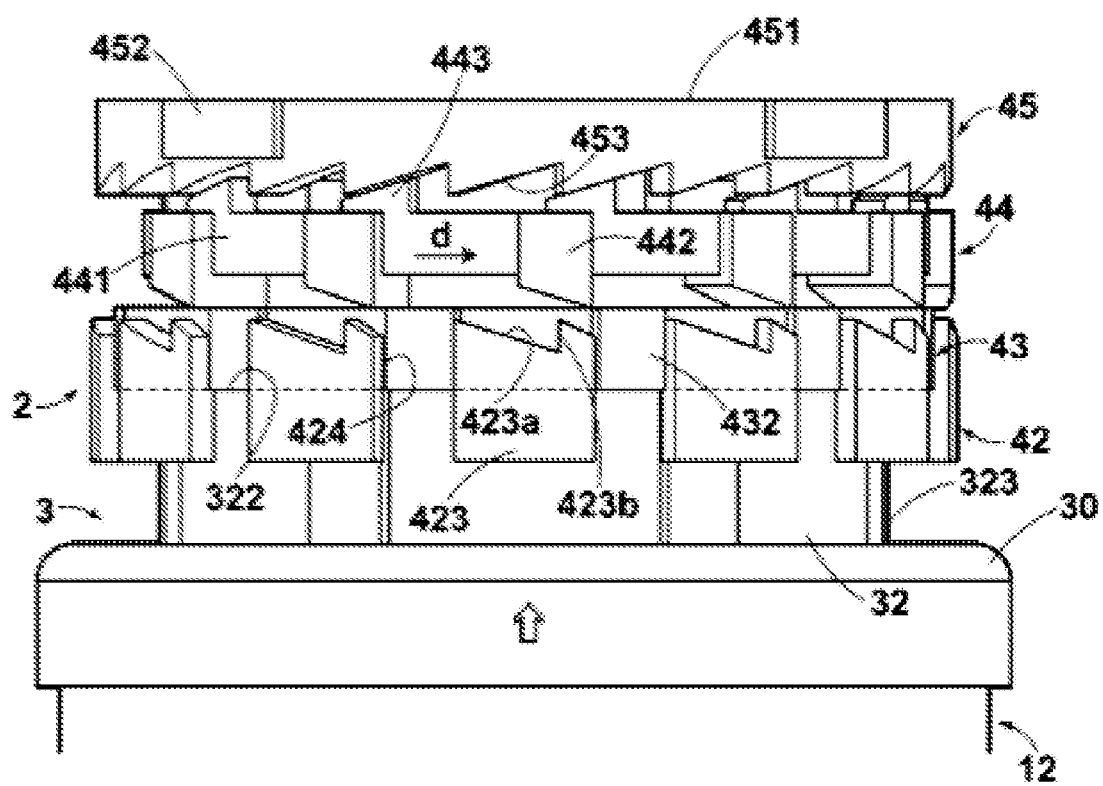
FIG. 13 is a drawing identical to that of FIG. 9 but showing the initial condition for lock release at which the supply connector has been pressed inward during the locked condition.

Subsequently, at release movement from the described locked condition, as shown in FIG. 13, when supply connector 3 again undergoes a pressing inward movement, first ring 43 and second ring 44 move upward, the lower end of second ring 44 is separated from stop steps 423b and becomes capable of rotation, second ring 44 rotates by contact with the inclined surfaces of hooking teeth 453 of third ring 45, and in conjunction with the subsequent retreat movement of supply connector 3, the inclined surfaces of guide protrusions 442 of second ring 44 reach second guide channels 424 from stop steps 423b and contact the inclined surfaces, and by this inclined surface contact second ring 44 is further rotated in rotation direction d, and guide protrusions 442 rotate to a position at which they will inserted into second guide channels 424. As shown in FIG. 7, at this rotation position of second ring 44, mating protrusions 321 become detached from lock protrusions 444 and align with the positions of the vertical channels, mating lock is released, connection cylinder 32 of supply connector 3 becomes capable of separation and shifting, and by the application force of release spring 47 it passes through spring holder 46 being applied with a separation operation and is ejected.

Described pressure regulator 5 is a component that executes attenuation adjustment of the primary pressure to a prescribed secondary pressure not having a relationship to the primary pressure, and it does so by the pressure adjustment of primary regulating valve 55 and secondary regulating valve 56 in conjunction with the movement of diaphragm 52.

FIG. 6 shown the pressure adjustment condition, with the fluid regulated by primary regulating valve 55 and secondary regulating valve 56 flowing into regulation chamber 530 and being discharged port 514 following precise pressure reduction to the secondary pressure.

Diaphragm 52 maintains a position at which the application force from regulator spring 513 has been equalized with the application force from the pressure difference between the secondary pressure and atmospheric pressure. Therefore, when the secondary pressure changes corresponding to such as fluctuation of the fluid discharge amount from discharge port 514 or fluctuation of the primary pressure, the displacement amount of diaphragm 52 changes in response to this, and primary regulating valve 55 and secondary regulating valve 56 move with linkage to the changing of the position of shaft 522, and this executes opening and closing movements in reciprocally different directions and maintains as fixed the secondary pressure. The application force of regulator spring 513 can be changed by moving regulator screw 512, and this enables discretionary setting of the secondary pressure.

Moreover, when pressure regulation for changing the primary pressures is executed by primary regulating valve 55, they are the reciprocal opposite characteristics as those pressure regulation characteristics executed by secondary regulating valve 56, and for a drop in primary pressure, secondary pressure is raised by regulation of primary regulating valve 55 and lowered by regulation of secondary regulating valve 56. Therefore, because the pressure loss received by the reflection surface of primary regulating valve 55 due to operation of primary pressure on the leading end of shank 524 at shaft 522 and the pressure loss received by the reflection surface of secondary regulating valve 56 due to operation of secondary pressure on boss 523 both cause shaft 522 to retreat and operate in the same direction, the structure becomes such that it regularizes the fluctuations of the secondary pressure in relation to fluctuations of the primary pressure by combining both pressure regulating characteristics.

Rephrased, when secondary pressure fluid is discharged from regulation chamber 530 and the secondary pressure drops, diaphragm 52 regulates pressure for obtaining a fixed secondary pressure by shaft 522 shifting forward (a downward shift in drawing), primary regulating valve 55 operating in the direction for opening and secondary regulating valve 56 operating in the direction for closing, the primary pressure fluid flowing into regulation chamber 530 after being reduced in pressure by primary regulating valve 55 and the secondary pressure rising, secondary pressure rising above the set value in conjunction with the drop in primary pressure being regulated by the degree of opening (pressure loss) of secondary regulating valve 56, shaft 522 executing retreat shifting (an upward shift in drawing) by displacement of diaphragm 52, primary regulating valve 55 executing close shifting and reducing the guided amount of fluid.

The pressure regulation characteristics that accompany the fluctuations of primary pressure, specifically, when fluid has been delivered from reception device 11, can be considered the reception error of primary regulating valve 55 in relation to the gradual drop in primary pressure within supply device 12. The pressure loss of primary regulating valve 55 that occurs with performing of opening and closing movements of secondary regulating valve 56 in the direction opposite to primary regulating valve 55 are in the same direction of the pressure loss of primary regulating valve 55 and are basically inverse properties. The regulating characteristics derived from primary regulating valve 55 are properties with which the secondary pressure drops in relation to a rise in primary pressure. In this regard, the regulating characteristics derived from secondary regulating valve 56 suppress the secondary pressure when primary pressure is low, and especially, when primary pressure is zero, it prevents reverse flow of fluid by the reverse check valve closing, and releases with a rise in primary pressure, and with characteristics with which the secondary pressure rises in relation to a rise in the primary pressure, these are inverse properties compared to the regulating characteristics derived from primary regulating valve 55 described above.

Both pressure regulating characteristics operate in the same direction in relation to shaft 522, and the regulating characteristics derived from a combination of two valves with inverse properties, primary regulating valve 55 and secondary regulating valve 56, are able to obtain a fixed secondary pressure in relation to the fluctuations in the primary pressure. Rephrased, when the primary pressure drops with fluctuation in conjunction with supply of fluid from supply device 12, by the pressure loss operating on primary regulating valve 55, the pressure loss operating on secondary regulating valve 56 becomes the characteristics for reducing the secondary pressure, and the composite characteristics for both sides is leveled and the fixed secondary pressure maintained, and this is assured with a simple structure.

In addition, with the separation condition and unused condition, there is design for prevention of fluid leakage by the operation of secondary regulating valve 56 and elastic plate 57 as a reverse check valve.

Second Embodiment

Figure 14:
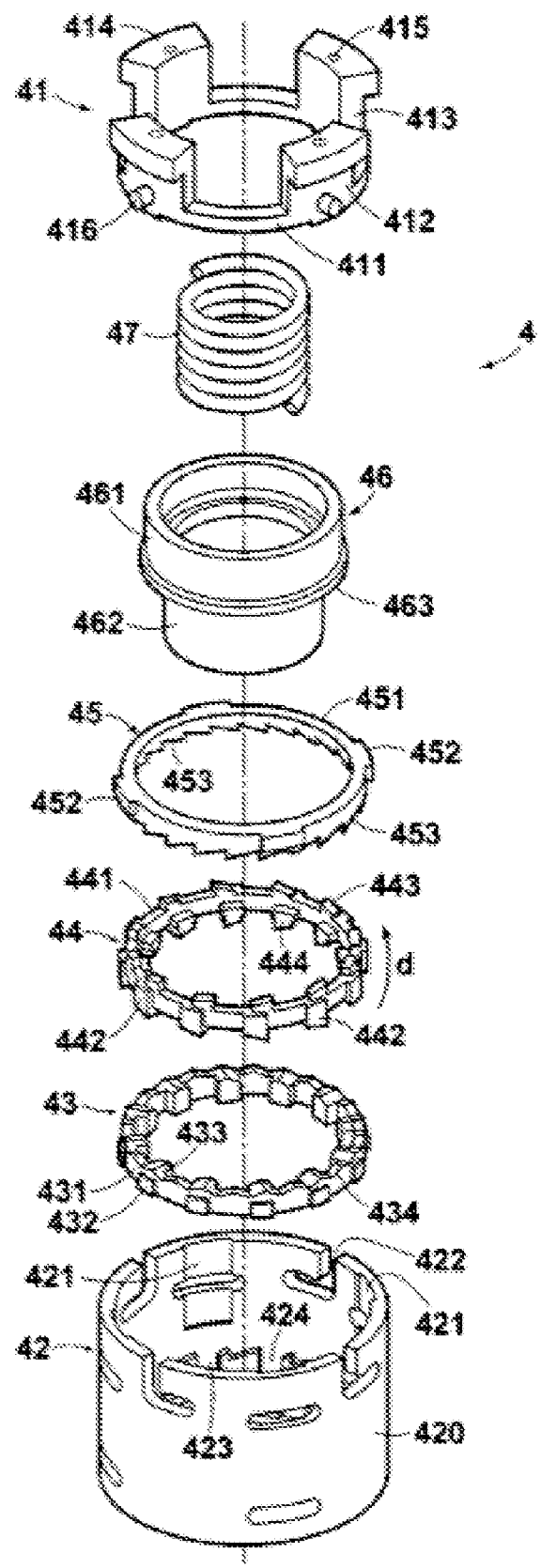
FIG. 14 is an exploded view perspective drawing of the main components of the fastening mechanism according to the second embodiment.
Figure 15:
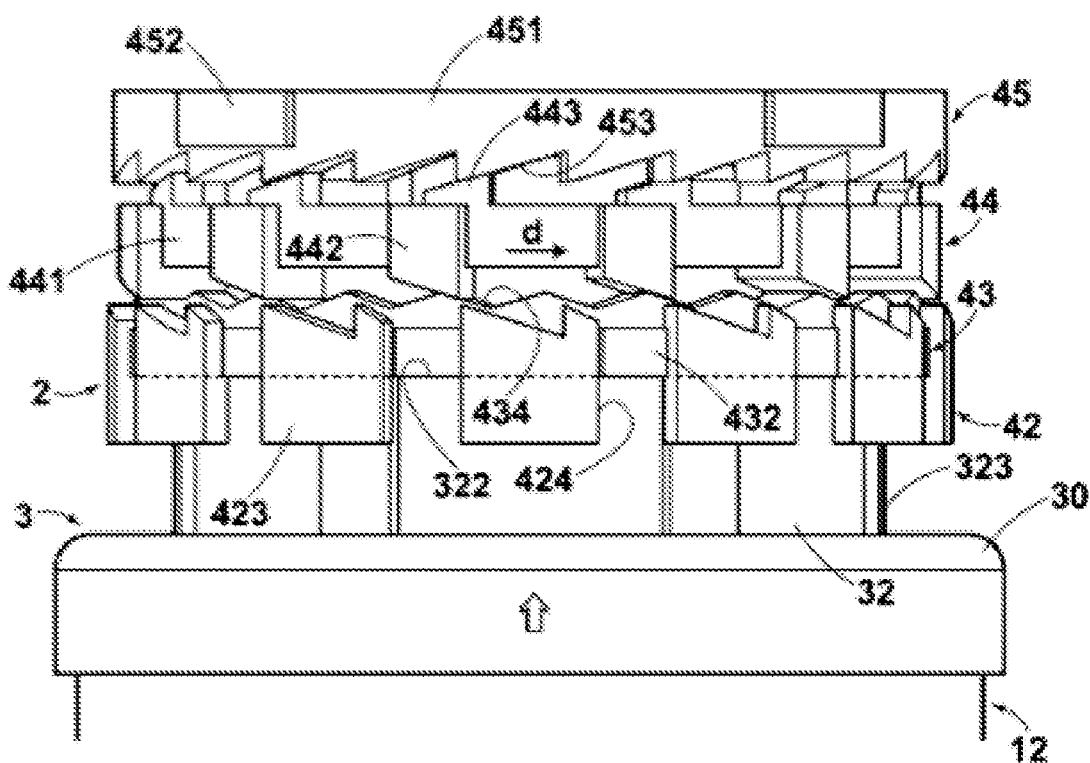
FIG. 15 is a drawing showing the movement condition of the fastening mechanism with one portion of the holder omitted.

FIG. 14 is an exploded view perspective drawing of the main components of the fastening mechanism (ratchet mechanism) according to the second embodiment, and FIG. 15 is a drawing showing the operating condition of the fastening mechanism of FIG. 14 with one portion of the holder omitted.

The points of this embodiment that differ from those of the first embodiment are the provision of indentations 434 on the surface of first ring 43 that contacts second ring 44. Otherwise it is structured identically to that of the first embodiment, and the same symbols are attached and those identical descriptions are omitted.

With this embodiment, when guide protrusions 442 of second ring 44 become detached from second guide channels 424 in conjunction with rising movement of supply connector 3, as shown in FIG. 15, second ring 44 receives rotation force by contact with the inclined surfaces on the lower surface of third ring 45, and it receives rotation force in rotation direction d by contact with indentations 434 of first ring 43, thereby performing more reliable incremental forward motion for second ring 44.

In order to separate supply connector 3 in the locked condition when supply connector 3 undergoes pressing inward movement, there can be obtained rotation force at separation of guide protrusions 442 of second ring 44 from stop steps 423b of ratchet protrusions 423 by contact between over and under third ring 45 and first ring 43.

Furthermore, it is acceptable to obtain rotation force for second ring 44 only by the contact surfaces of indentations 434 of first ring 43.

Figure 16:
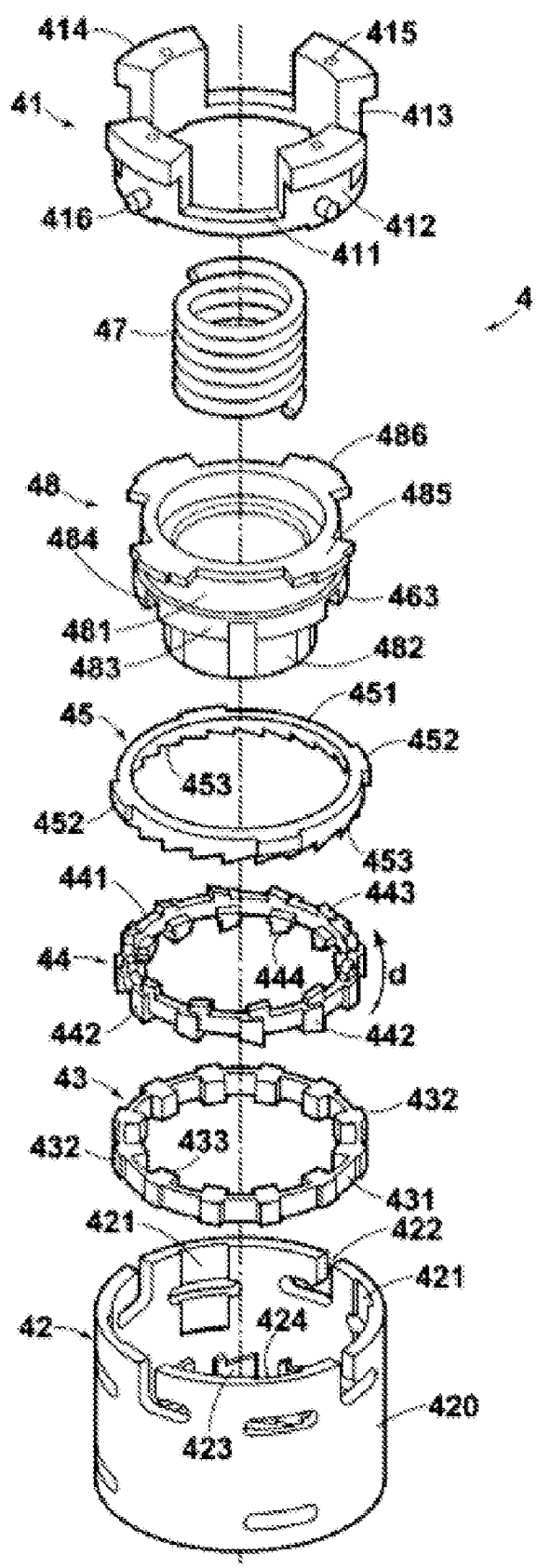
FIG. 16 is an exploded view perspective drawing of the main components of the fastening mechanism according to the third embodiment.
Figure 17:
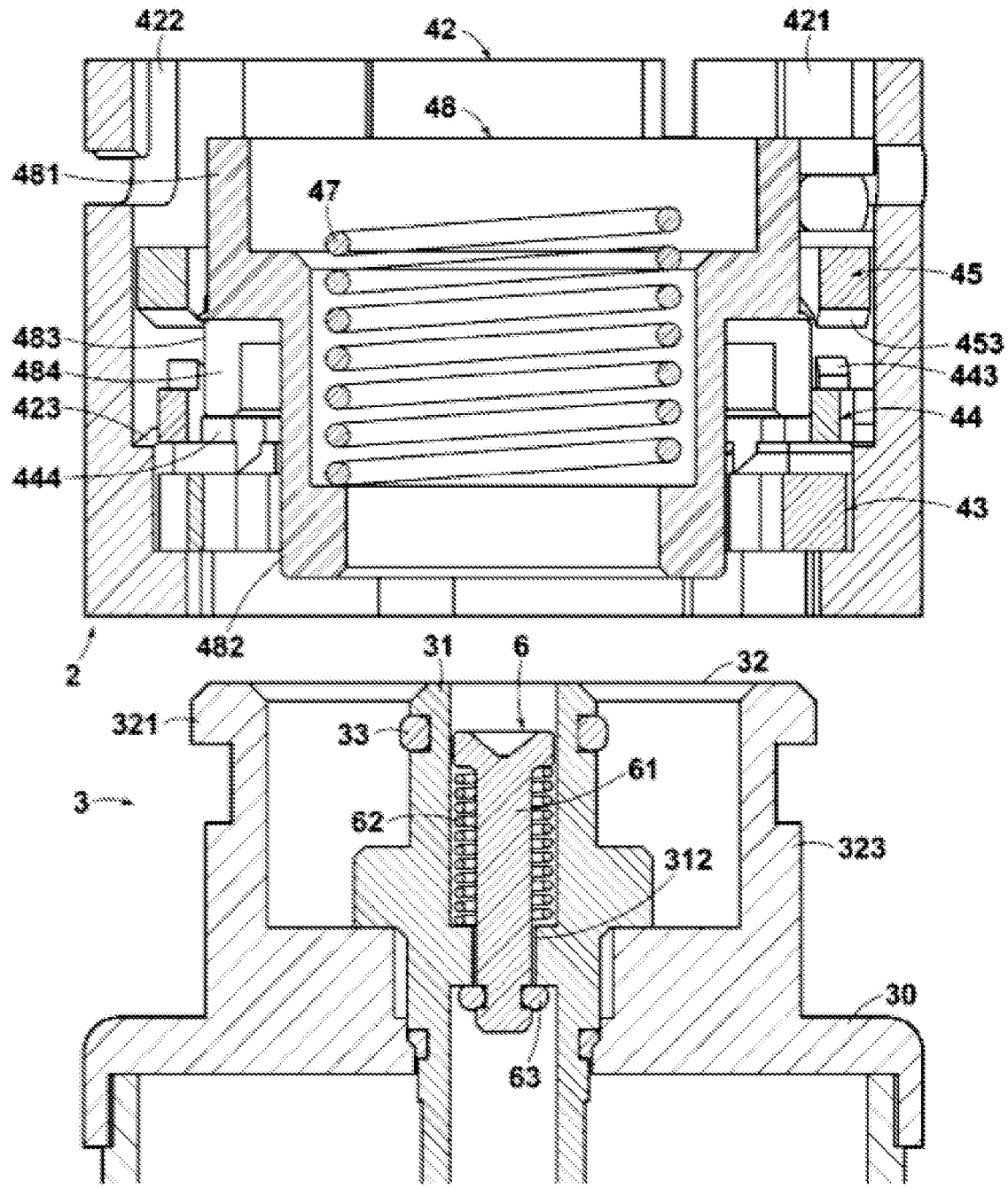
FIG. 17 is a cross section drawing showing only the main components of the fastening mechanism of FIG. 16 in the condition prior to connection.
Figure 18:
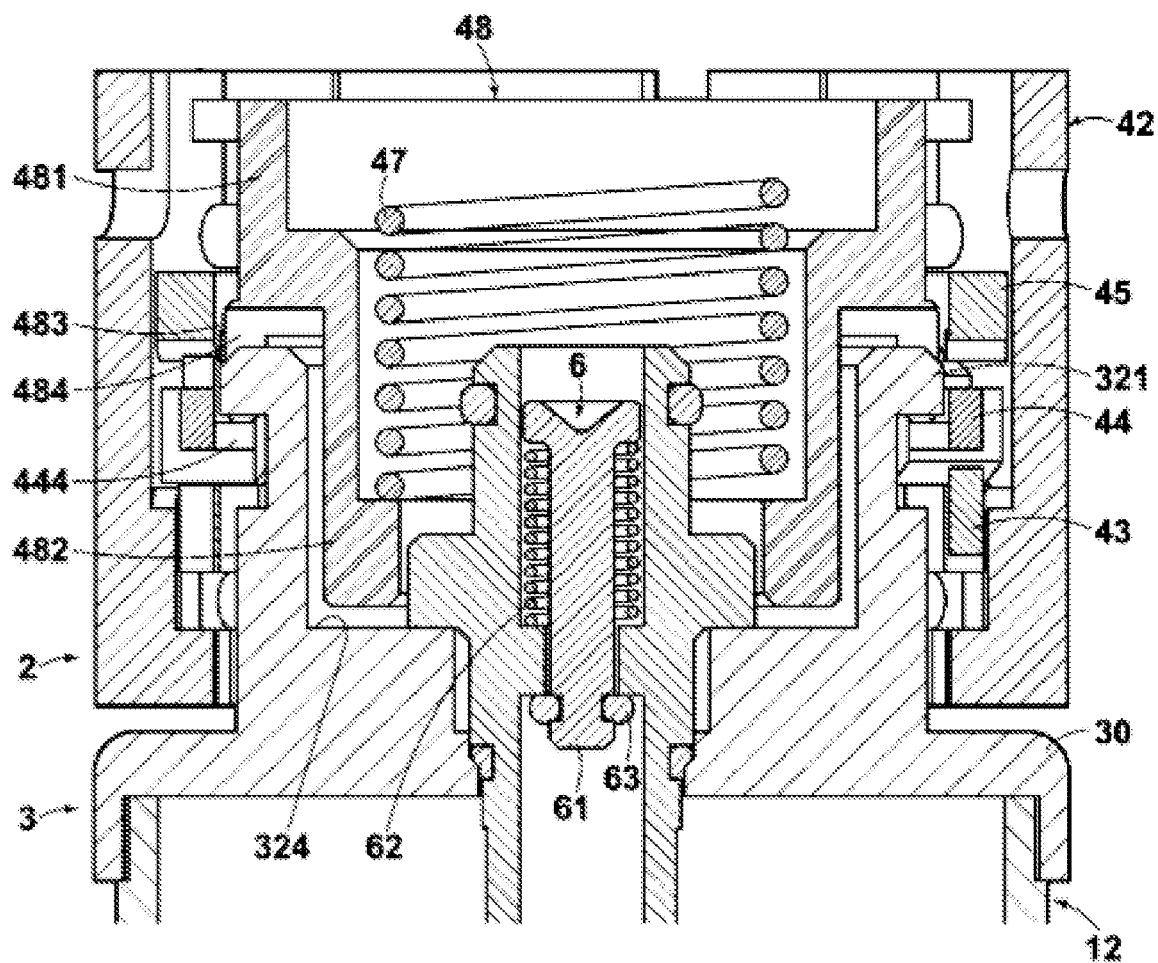
FIG. 18 is a cross section drawing showing only the main components of the fastening mechanism of FIG. 16 in the condition midway through the connection operation.

FIG. 16 is an exploded view perspective drawing of the main components of the fastening mechanism (ratchet mechanism) according to the third embodiment, and FIGS. 17 and 18 are cross section drawings showing the operating condition of the fastening mechanism of FIG. 16 with only the main components.

With this embodiment, application force from release spring 47 is always caused to operate on second ring 44, and this generates a click sensation and fastening sound from the ratchet.

Specifically, there is no operation of application force of release spring 47 directly on supply connector 3, and spring holder 48 having a differing shape is disposed in order to cause operation in the separation direction by means of second ring 44, and other components are identical to that of the first embodiment, and the same symbols are attached and those identical descriptions are omitted.

Spring holder 48 of this embodiment provides upper cylinder 481 and lower cylinder 482 with smaller diameter, pressing section 483 extending in the axial direction from the lower end of upper cylinder 481, and for guide sections 485 at equal intervals around the periphery of the upper end of lower cylinder 482 for positioning.

Guide section 485 is inserted into vertical channels 413 between fixed sections 412 of holder unit 41 and is capable of shifting in the axial direction, and peripheral tab 486 is inserted into first guide channels 421 of ratchet holder 42 and is not capable of rotation.

Pressing section 483 established extending from the lower end of upper cylinder 481 provides vertical channels 484 for insertion passage of mating protrusions 321 of connection cylinder 32 of supply connector 3, and at the outer side of connection cylinder 32 the lower end of pressing section 483 contacts and from above continuously applies force onto lock protrusions 444 of second ring 44, without relation to the upper or lower position of connection cylinder 32.

In addition, the length of lower cylinder 482 of spring holder 48 is formed to be short, and as shown in FIG. 18, at connection movement of supply connector 3, supply connector 3 is structured so as not to contact the leading edge of lower cylinder 482 of spring holder 48. Rephrased, by the contact of pressing shoulder 322 of supply connector 3 against inner protrusions 433 of first ring 43, there is the reception of application force of release spring 47 in the separation direction.

In this way, second ring 44 receives application force during the time of its rotation movement, and by obtaining an operational sound at the time of mating to stop steps 423b of ratchet protrusions 423 and the time second ring 44 inserts and fastens within second guide channels 424 from the upper sections of stop steps 423b, there is obtained confirmation that the connection movement and separation movement have been performed.

With the above described embodiment, fluid is stored within supply device 12 in a pressurized condition for supply to reception device 11, but this invention can be applied even with the supply of non-pressurized fluids.

While the foregoing describes the present invention in relation to illustrations and examples, it is understood that it is not intended to limit the scope of the invention to the illustrations and examples described herein. On the contrary, it is intended to cover all alternative modifications and equivalents that may be included in the spirit and the scope of the invention as defined by the appended claims.

What is claimed is:

1. A connector structure with a lock mechanism, said connector structure comprising a supply connector for supplying fluid and a reception connector for receiving the supply of fluid, and is characterized by possessing an operating member that shifts in conjunction with the connection movement of said supply connector and said reception connector, by providing a fastening mechanism capable of maintaining a lock condition in which has been fastened said supply connector and said reception connector in conjunction with shifting of said operating member and for releasing the lock condition of said supply connector and said reception connector with further shifting of said operating member in conjunction with the next pressing inward operation of said operating member, and by providing a force applicator for applying force in the separation direction to said supply connector, and being capable of supplying fluid from said supply connector to said reception connector, wherein said connector structure is further characterized by the fastening mechanism providing a mating component disposed on said supply connector and an operating member disposed on said reception connector and which is capable of shifting in conjunction with the pressing inward operation of said supply connector and mating with said mating component, wherein said connector structure is further characterized by said operating member being structured with a second ring capable of rotation shift between a first ring and a third ring, that the first ring and third ring maintain rotation capability and axial direction shift capability at the interior of a ratchet holder, that the second ring provide guide protrusions for mating with ratchet steps disposed on said ratchet holder, and locking protrusions for mating with mating protrusions to act as mating components disposed on said supply connector, and slide hooks for receiving rotation force by contact with the third ring, so that the second ring shifts in the axial direction through influence of the first ring in conjunction with the connection operation of said supply connector, that while in such transit it receives rotation force by contact with the third ring, that it rotation shifts by one increment in conjunction with the change in mating position for the single instance axial direction shift, that said locking protrusions enters a lock condition by mating with said mating protrusions, and that at the next axial direction shift the second ring rotation shifts by the next one increment and mating between said locking protrusions and said mating protrusions is released.

2. A connector structure according to claim 1 characterized by said second ring receiving additional rotation direction force by contact with said first ring.

3. A connector structure according to claim 1 characterized by a release spring application force operating on said supply connector in the separation direction and also operate on said operating member to prevent floating movement of said operating member.

4. A connector structure according to claim 1 characterized by a fastening sound being emitted from within said operating member at time of rotation movement by ordinary operation of application force.

* * * * *